(12) United States Patent
Ikuta et al.

(10) Patent No.: US 11,287,355 B2
(45) Date of Patent: Mar. 29, 2022

(54) SMEAR PREPARATION APPARATUS AND SMEAR PREPARATION METHOD

(71) Applicant: SYSMEX CORPORATION, Kobe (JP)

(72) Inventors: Junya Ikuta, Kobe (JP); Masaharu Shibata, Kobe (JP); Noriyuki Nakanishi, Kobe (JP); Mitsuo Yamasaki, Kobe (JP); Yuji Takano, Kobe (JP); Ken Nishikawa, Kobe (JP)

(73) Assignee: SYSMEX CORPORATION, Kobe (JP)

( * ) Notice: Subject to any disclaimer, the term of this patent is extended or adjusted under 35 U.S.C. 154(b) by 0 days.

(21) Appl. No.: 16/911,449

(22) Filed: Jun. 25, 2020

(65) Prior Publication Data
US 2020/0408653 A1    Dec. 31, 2020

(30) Foreign Application Priority Data

Jun. 26, 2019    (JP) .............................. JP2019-118738

(51) Int. Cl.
*G01N 1/00*    (2006.01)
*G01N 1/31*    (2006.01)
*G01N 1/28*    (2006.01)

(52) U.S. Cl.
CPC ........... *G01N 1/312* (2013.01); *G01N 1/2813* (2013.01)

(58) Field of Classification Search
None
See application file for complete search history.

(56) References Cited

U.S. PATENT DOCUMENTS

2009/0098646 A1    4/2009    Takizawa et al.
2018/0356319 A1*   12/2018   Nagai .................. G01N 1/30

FOREIGN PATENT DOCUMENTS

| EP | 3410093 A1 | 12/2018 |
| EP | 3441770 A1 | 2/2019 |
| WO | 2016/084377 A1 | 6/2016 |
| WO | 2017/038323 A1 | 3/2017 |
| WO | 2017/130790 A1 | 8/2017 |

OTHER PUBLICATIONS

Extended European search report (EESR) dated Oct. 27, 2020 in a counterpart European patent application.
Extended European search report (EESR) dated Oct. 27, 2020 in a counterpart European patent application of a related U.S. Appl. No. 16/911,426.

* cited by examiner

*Primary Examiner* — Jyoti Nagpaul
(74) *Attorney, Agent, or Firm* — Metrolex IP Law Group, PLLC

(57) ABSTRACT

A smear preparing apparatus may include: a staining unit including staining tanks that are configured to receive glass slides smeared with samples and to accommodate a staining solution used to stain the samples smeared on the glass slides; a transfer unit that holds the glass slides and transfers the glass slides to the staining unit; a fluid circuit that supplies the staining solution to each of the staining tanks in the staining unit; and a controller that determines a staining tank used for staining processing among the staining tanks in response to a manipulation by a user.

21 Claims, 20 Drawing Sheets

SMEAR PREPARATION METHOD

FIG. 11

|  | DOUBLE STAINING ||
|  | STAINING TANK 21d | STAINING TANK 21e |
| --- | --- | --- |
| STAINING TIME C ≤ THRESHOLD | USED | NOT USED |
| STAINING SOLUTION AMOUNT | V1 | V2 |
| CLEANING LIQUID AMOUNT | V3 | V4 |
| STAINING TIME C > THRESHOLD | USED | USED |
| STAINING SOLUTION AMOUNT | V1 | V1 |
| CLEANING LIQUID AMOUNT | V3 | V3 |

FIG. 12

|  | SINGLE STAINING |||
|  | STAINING TANK 21c | STAINING TANK 21d | STAINING TANK 21e |
| --- | --- | --- | --- |
| STAINING TIME C ≤ FIRST THRESHOLD (C > SECOND THRESHOLD) | USED | USED | NOT USED |
| STAINING SOLUTION AMOUNT | V1 | V1 | V2 |
| CLEANING LIQUID AMOUNT | V3 | V3 | V4 |
| STAINING TIME C > FIRST THRESHOLD | USED | USED | USED |
| STAINING SOLUTION AMOUNT | V1 | V1 | V1 |
| CLEANING LIQUID AMOUNT | V3 | V3 | V3 |
| STAINING TIME C ≤ SECOND THRESHOLD | USED | NOT USED | NOT USED |
| STAINING SOLUTION AMOUNT | V1 | V2 | V2 |
| CLEANING LIQUID AMOUNT | V3 | V4 | V4 |

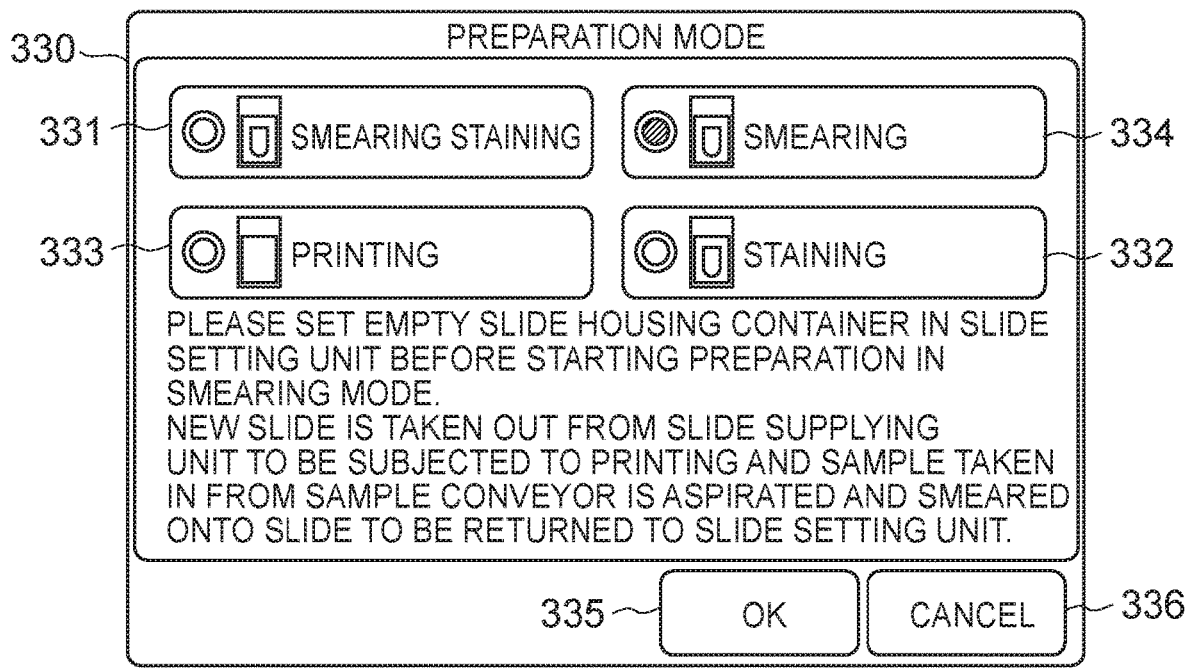

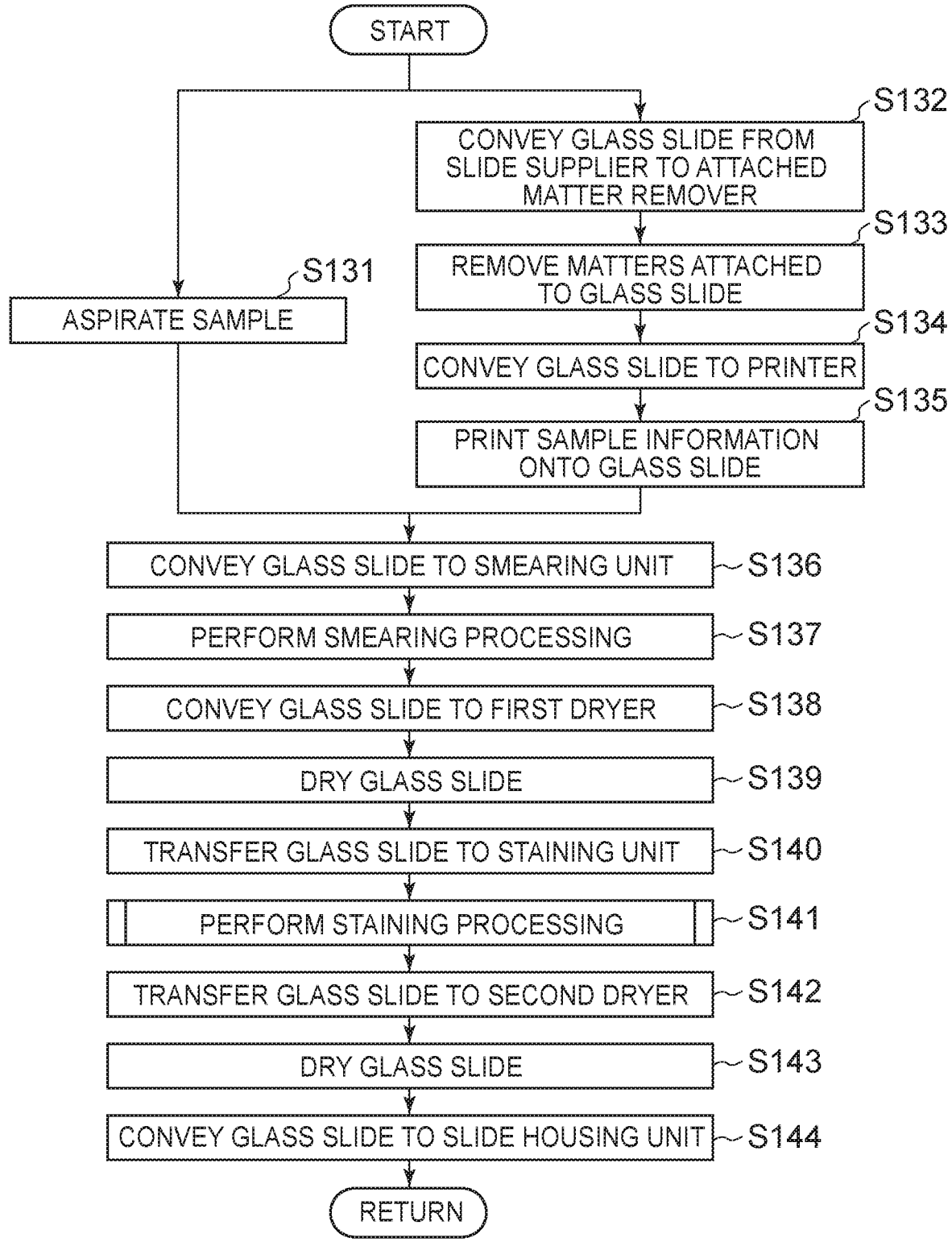

SMEAR PREPARATION APPARATUS AND SMEAR PREPARATION METHOD

CROSS REFERENCE TO RELATED APPLICATIONS

This application claims priority from to prior Japanese Patent Application No. 2019-118738 filed with the Japan Patent Office on Jun. 26, 2019, the entire contents of which are incorporated herein by reference.

BACKGROUND

The disclosure relates to a smear preparing apparatus and a smear preparing method that stain specimens on glass slides.

As illustrated in FIG. 27, International Patent Application Publication No. WO2016/084377 ("Patent Literature 1") discloses a smear preparing apparatus that automatically prepares smears by performing smearing processing of smearing samples onto glass slides 901 and performing staining processing on the glass slides 901 smeared with the samples. The smear preparing apparatus includes staining tanks 902 and a transfer unit 903. The staining tanks 902 include five staining tanks 902 of a first staining tank 902a to a fifth staining tank 902e. The transfer unit 903 takes the glass slides 901 in and out of the staining tanks 902 one by one. The glass slides 901 are transferred to the tanks in order, starting from the first staining tank 902a and are processed by being immersed in a staining solution accommodated in each tank for predetermined setting time. The number of glass slides 901 that can be held in each staining tank 902 is set to a number corresponding to the setting time required to process the glass slides 901.

In the smear preparing apparatus of Patent Literature 1 described above, the staining solution is accommodated in each of the staining tanks and the glass slides are transferred to the staining tanks in order. A consumption amount of the staining solution may be reduced by, for example, reducing the number of glass slides that can be held by each staining tank and reducing the volume of the staining tank. However, when the number of glass slides that can be held by the staining tank is reduced, there may occur a case where the glass slide has to wait to be stained until the staining of the preceding glass slide arranged in the staining tank in advance is completed. As a result, the processing speed of the smear preparing apparatus may decrease. Accordingly, there is a demand for reducing the consumption amount of the staining solution while maintaining the processing speed in the smear preparation.

One or more aspects aim to reduce the consumption amount of the staining solution while maintaining the processing speed in the smear preparation.

SUMMARY

A smear preparing apparatus according to one or more aspects may include: a staining unit including staining tanks that are configured to receive glass slides smeared with samples and to accommodate a staining solution used to stain the samples smeared on the glass slides; a transfer unit that holds the glass slides and transfers the glass slides to the staining unit; a fluid circuit that supplies the staining solution to each of the staining tanks in the staining unit; and a controller that determines a staining tank used for staining processing among the staining tanks in response to a manipulation by a user.

In a smear preparing method according to one or more aspects, staining processing may be performed by immersing samples smeared on glass slides in a staining solution accommodated in a staining unit and the staining unit includes staining tanks configured to receive the glass slides smeared with the samples and to accommodate the staining solution. The smear preparing method may include: determining a staining tank used for the staining processing among the staining tanks in response to a manipulation by a user, and performing the staining processing by transferring the glass slides to the staining tank used for the staining processing.

BRIEF DESCRIPTION OF DRAWINGS

FIG. 11 is a diagram illustrating a method of determining a staining tank(s) used for staining processing in double staining;

FIG. 12 is a diagram illustrating a method of determining a staining tank(s) used for staining processing in single staining;

FIG. 16 is a diagram illustrating a mode selection screen;

FIG. 17 is a flow diagram illustrating staining solution filling processing;

FIG. 18 is a flow diagram illustrating operations in a smearing staining mode;

DETAILED DESCRIPTION

Figure 1:
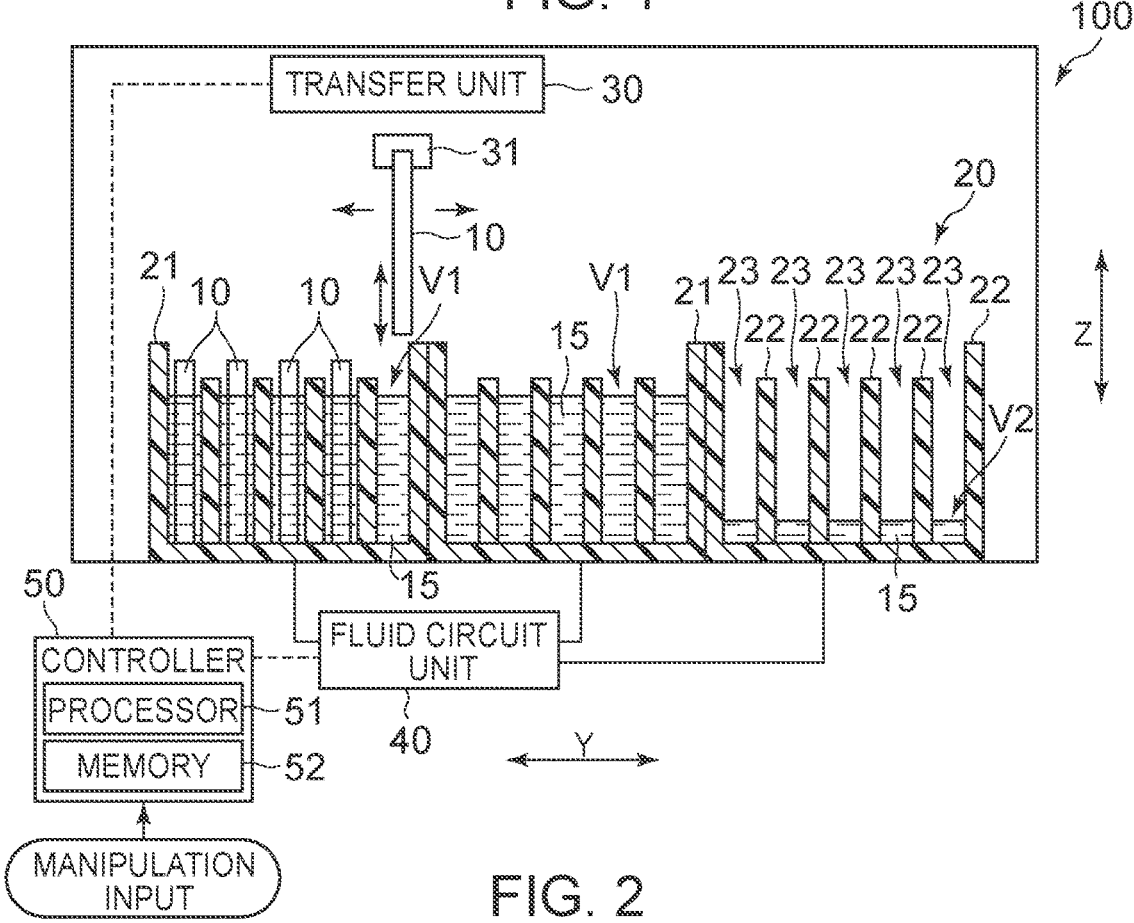
FIG. 1 is a schematic diagram illustrating a smear preparing apparatus.

In order to achieve the aforementioned object, the present inventors have made earnest studies and obtained the following knowledge. Specifically, in a smear preparing apparatus, staining conditions, such as staining time for performing staining processing in staining tanks and a staining method to be performed, are changed depending on the type of the samples and preference of the user. Moreover, the inventors have obtained such knowledge that the smear preparing apparatus can maintain processing speed without using some of the staining tanks, depending on the staining conditions. Accordingly, as illustrated in FIG. 1, a smear preparing apparatus according to a first aspect includes: a staining unit (20) that includes staining tanks (21) which are designed to receive glass slides (10) smeared with samples and to accommodate a staining solution (15) used to stain the samples smeared on the glass slides (10); a transfer unit (30) that holds the glass slides (10) and transfer the glass slides (10) to the staining unit (20); a fluid circuit unit (40) that supplies the staining solution (15) to each of the staining tanks (21) in the staining unit (20); and a controller (50) that determines a staining tank (21) used for staining processing among the staining tanks (21) in response to a manipulation by a user.

In the smear preparing apparatus according to a first aspect, due to the aforementioned configuration, the controller (50) can determine the staining tank (21) used for the staining processing and the staining tank (21) not used for the staining processing among the staining tanks (21) in response to the manipulation by the user. The smear preparing apparatus can thereby perform the staining processing by transferring the glass slides (10) to the staining tank (21) used for the staining processing at a predetermined time interval, without using the staining tank (21) not used for the staining processing. Accordingly, the staining solution (15) does not have to be supplied to the staining tank (21) not used for the staining processing in an amount necessary for the staining processing and the amount of the staining solution supplied to the staining tank (21) not used for the staining processing can be reduced. Moreover, assume a case where the controller (50) determines not to use some of the staining tanks (21). In this case, if the processing speed is to decrease due to non-use of any of the staining tanks (21), the processing speed can be maintained by increasing the number of staining tanks (21) used for the staining processing because the actual number of the staining tanks (21) is not reduced. As a result, it is possible to reduce the consumption amount of the staining solution (15) while maintaining the processing speed in the smear preparation.

Figure 2:
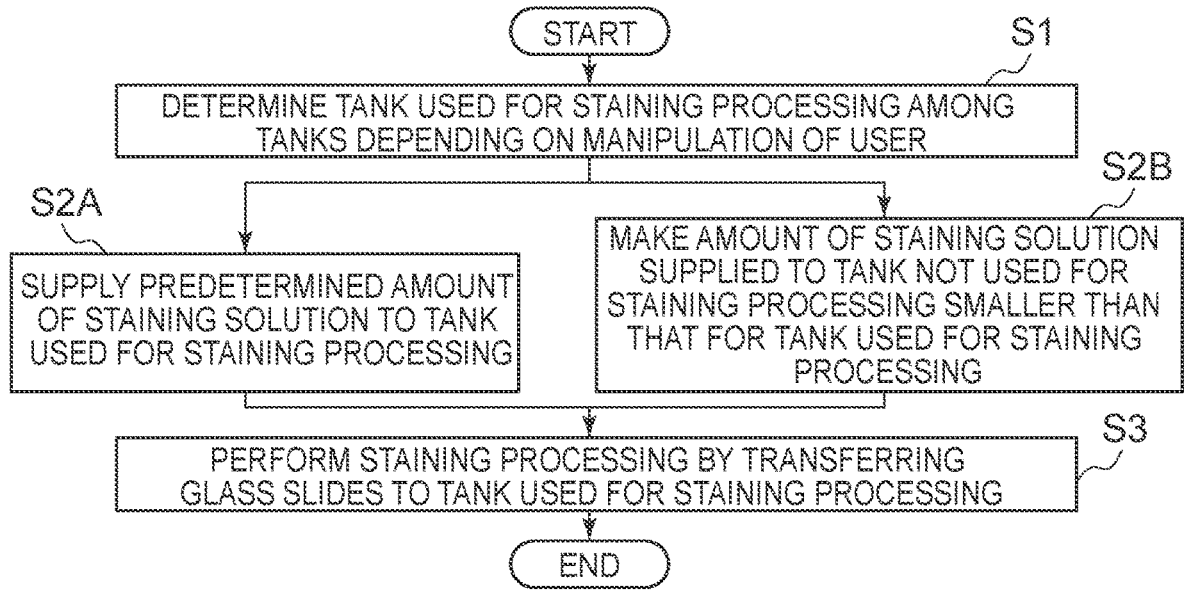
FIG. 2 is a flow diagram illustrating a smear preparing method.

As illustrated in FIGS. 1 and 2, a smear preparing method according to a second aspect is a smear preparing method in which staining processing is performed by immersing samples smeared on glass slides (10) in a staining solution (15) accommodated in a staining unit (20) including staining tanks (21) that are designed to receive the glass slides (10) smeared with the samples and to accommodate the staining solution (15), and includes determining the staining tank (21) used for the staining processing among the staining tanks (21) in response to a manipulation by a user.

In the smear preparing apparatus according to a second aspect, the staining tank (21) used for the staining processing and the staining tank (21) not used for the staining processing among the staining tanks (21) can be determined in response to the manipulation by the user as described above. Thus, it is possible to perform the staining processing by transferring the glass slides (10) to the staining tank (21) used for the staining processing at a predetermined time interval, without using the staining tank (21) not used for the staining processing. Accordingly, the staining solution (15) does not have to be supplied to the staining tank (21) not used for the staining processing in an amount necessary for the staining processing and the amount of the staining solution supplied to the staining tank (21) not used for the staining processing can be reduced. Moreover, assume a case where some of the staining tanks (21) are determined not to be used. If the processing speed is to decrease due to non-use of any of the staining tanks (21), the processing speed can be maintained by increasing the number of staining tanks (21) used for the staining processing because the actual number of the staining tanks (21) is not reduced. As a result, it is possible to reduce the consumption amount of the staining solution (15) while maintaining the processing speed in the smear preparation.

One or more aspects reduce the consumption amount of the staining solution while maintaining the processing speed in the smear preparation.

An embodiment is explained below based on drawings.

A configuration of a smear preparing apparatus 100 according to an embodiment is described with reference to FIG. 1.

(Overview of Smear Preparing Apparatus)

The smear preparing apparatus 100 is an apparatus that automatically prepares smears by performing staining processing on glass slides 10 for specimen smeared with samples. The samples are, for example, blood.

As illustrated in FIG. 1, the smear preparing apparatus 100 includes a staining unit 20, a transfer unit 30, a fluid circuit unit 40 or a fluid circuit, and a controller 50.

The staining unit 20 includes staining tanks 21. The staining tanks 21 can accommodate staining solution 15 used to stain the samples smeared onto the glass slides 10. The staining tanks 21 are each formed in a container shape and can be used to accommodate the staining solution 15 therein such that the glass slides 10 can be immersed. The container shape is, for example, a shape that includes a bottom portion and a side surface standing up from a peripheral edge of the bottom portion and that has a liquid accommodating space surrounded by the bottom portion and the side surface. The staining tanks 21 are capable of accommodating the staining solution 15 to such a depth that application regions where the samples are applied to the glass slides 10 are immersed in the staining solution 15. Upper surfaces of the staining tanks 21 are partially or entirely open to allow downward insertion of the glass slides 10 from above. The staining tanks 21, for example, accommodate containers made of resin.

Moreover, the glass slides 10 smeared with the samples can be arranged in the staining tanks 21. The glass slides 10 are rectangular flat plates made mainly of transparent glass. For example, the glass slides 10 can be arranged in the staining tanks 21 to stand upright separately from one another. Standing upright is a state in which surfaces of the flat-plate shaped glass slides 10 extend in an up-down direction. The staining tanks 21 include holders 22 that hold the glass slides 10. The holders 22 form insertion regions 23 in which the glass slides 10 are inserted. In the state where the glass slides 10 are arranged in the staining tanks 21, at least portions of the glass slides 10 other than the sample application regions come into contact with the holders 22 to maintain the posture of the glass slides 10. The staining tanks 21 are designed to receive the glass slides 10 arranged at certain intervals. The staining processing is performed by immersing the glass slides 10, held by the holders 22 in the staining tanks 21, in the staining solution 15 for predetermined time.

The holders 22 may employ any of various configurations. For example, as illustrated in FIG. 1, the holders 22 may be members arranged at certain intervals in a predetermined direction. In this case, the glass slides 10 are inserted between adjacent holders 22. The glass slides 10 are each held such that portions of a front surface and a back surface other than the sample application region come into contact respectively with the adjacent holders 22. For example, the holders 22 may each be a recess portion or a groove portion to which a lower end portion of one glass slide 10 is fitted in the bottom portion of the staining tank 21. In this case, the lower end portion of the glass slide 10 engages with the recess portion or the groove portion and is held in a standing state. The holders 22 may each be, for example, grooves extending in the up-down direction and formed on paired side surfaces of the staining tank 21 facing each other. In this case, both edge portions of one glass slide 10 are inserted into the grooves on the paired side surfaces to be held by the grooves. The number of holders 22 may be any number more than one and can be set depending on the configuration of the apparatus.

The staining tanks 21 may have the same structure or have structures different from one another. The staining tanks 21 may be able to hold the same number of glass slides 10 at the same time (specifically, have the same number of insertion regions 23) or may be able to hold different numbers of glass slides 10.

The number of staining tanks 21 may be determined depending on the number of steps in the staining processing. Different staining solutions are used in different steps. In other words, the number of staining tanks 21 may be determined depending on the number of types of staining solutions used in the staining processing. The staining unit 20 may be provided with multiple staining tanks 21 used to perform one staining processing step. In other words, multiple staining tanks 21 that accommodate the same type of staining solution 15 may be provided.

FIG. 1 illustrates an example in which the staining unit 20 includes three staining tanks 21. FIG. 1 illustrates an example in which each staining tank 21 can hold five glass slides 10 at maximum.

The transfer unit 30 holds the glass slides 10 and transfers the glass slides 10 to the staining unit 20. The transfer unit 30 can arrange each of the glass slides 10 smeared with the samples in a selected one of the staining tanks 21. The transfer unit 30 can select one of the insertion regions 23 in the staining tanks 21 and insert each glass slide 10 in the selected insertion region 23. The transfer unit 30 can take out the glass slides 10 arranged in any of the staining tanks 21. The transfer unit 30 may, for example, transfer the glass slides 10 smeared with the samples to the staining unit 20 at predetermined time intervals.

For example, the transfer unit 30 grabs each glass slide 10 smeared with the sample and transfers the glass slide 10. For example, the transfer unit 30 holds each glass slide 10 from above such that that glass slide 10 hangs down, and moves the held glass slide 10 in a horizontal direction. The transfer unit 30 arranges the held glass slide 10 in one of the staining tanks 21 by moving the held glass slide 10 downward from above the staining tank 21. The transfer unit 30 takes each glass slide 10 out of the staining tank 21 by holding the glass slide 10 arranged in the staining tank 21 and moving the glass slide 10 upward.

Various configurations can be employed as the configuration of the transfer unit 30 that takes the glass slides 10 in and out of the staining tanks 21. For example, as illustrated in FIG. 1, the transfer unit 30 is a three-axis Cartesian robot that is movable in the horizontal direction and the up-down direction (Z-axis direction) and that includes a hand 31 used to grip the glass slides 10. The configuration may be such that the transfer unit 30 is movable only in one of the horizontal direction and the up-down direction and the staining tanks 21 is movable in the other one of the horizontal direction and the up-down direction. For example, the hand 31 may be an open-close mechanism that can grab the glass slide 10 by holding it between portions of the hand 31. The hand 31 may be an aspiration mechanism that holds a predetermined portion of the glass slide 10 by means of suction using negative pressure.

The transfer unit 30 can hold at least one glass slides 10. The transfer unit 30 may be capable of holding multiple glass slides 10 simultaneously. In an example of FIG. 1, the transfer unit 30 takes the glass slides 10 in and out of the staining tanks 21 one by one.

The fluid circuit unit 40 supplies the staining solution 15 to the staining tanks 21 of the staining unit 20. The fluid circuit unit 40 can supply the staining solution 15 to the staining tanks 21 individually. The fluid circuit unit 40 includes liquid delivery pipes such as tubes connected to the staining tanks 21. The fluid circuit unit 40 includes a pump that generates pressure used to deliver liquid to the staining tanks 21 or is connected to a pressure source that supplies pressure used to deliver liquid to the staining tanks 21. The fluid circuit unit 40 includes a chamber that stores the staining solution 15 to be supplied to the staining tanks 21 or is connected to a staining solution container. The fluid circuit unit 40 can determine a quantity of the staining solution 15 and supply a specified quantity of the staining solution 15 to any of the staining tanks 21. The quantity of the staining solution 15 can be determined by using a metering pump such as a diaphragm pump or a syringe pump or by using a metering chamber with a known-volume.

The controller 50 controls the transfer unit 30 and the fluid circuit unit 40. The controller 50 is a computer including a processor 51 such as a CPU and a volatile and/or non-volatile memory 52. The computer functions as the controller of the smear preparing apparatus 100 by causing the processor 51 to execute a program stored in the memory 52. The processor 51 may be a FPGA (field-programmable gate array) or the like designed to function as the controller 50.

In an embodiment, the smear preparing apparatus 100 can perform the staining processing by using only at least one of the staining tanks 21 included in the staining unit 20. In other words, not all of the staining tanks 21 included in the staining unit 20 are necessarily used for the staining processing. Moreover, the controller 50 determines the staining tank(s) used for the staining processing among the staining tanks 21 in response to a manipulation by a user.

For example, assume that a time interval in transfer of the glass slides 10 by the transfer unit 30 is A [seconds]. Assume that the number of glass slides 10 that can be held by each staining tank 21 is B. Assume that the staining time in the staining tank 21 is C [seconds]. In this description, the staining time means time in which each glass slide 10 is held in the staining tank 21 to be immersed in the staining solution 15. In this case, (C/A) glass slides 10 are transferred into the staining tank 21 in a period from when the first glass slide 10 is arranged in the staining tank 21 to when the first glass slide 10 is taken out after lapse of C seconds.

When the number (C/A) of glass slides 10 transferred to the staining tank 21 in the staining time is greater than the number B of glass slides 10 that can be held by the staining tank 21, the controller 50 performs control such that the staining processing is performed by using multiple staining tanks 21 in parallel. For example, when B<(C/A)≤2B, two staining tanks 21 are used. When 2B<(C/A)≤3B, three staining tanks 21 are used.

Meanwhile, when the number (C/A) of glass slides 10 transferred to the staining tank 21 in the staining time is equal to or less than the number B of glass slides 10 that can be held by the staining tank 21, the controller 50 performs control such that the staining processing is performed by using one staining tank 21. Specifically, when (C/A)≤B, one staining tank 21 is used.

This can avoid the case where all insertion regions 23 of the staining tank 21 are occupied and the glass slides 10 wait to be transferred to the staining tank 21, and thus a certain level of processing speed can be secured. Moreover, when two staining tanks 21 are used, the other staining tank 21 is not used for the staining processing. When one staining tank 21 is used, the other two staining tanks 21 are not used for the staining processing. In this case, the supply amount of the staining solution 15 can be reduced by an amount corresponding to the staining tank 21 not used for the staining processing.

Accordingly, the controller 50 may perform control of reducing the usage amount of the staining solution 15 by suppressing supply of the staining solution 15 to the staining tank(s) not used for the staining processing among the staining tanks 21. For example, the controller 50 controls the fluid circuit unit such that the fluid circuit unit does not supply the staining solution 15 to the staining tank(s) not used for the staining processing among the staining tanks 21 or supplies the staining solution 15 to the staining tank(s) not used for the staining processing in a smaller amount (referred to as staining solution amount V2) than an amount (referred as V1) of the staining solution supplied to the staining tank(s) used for the staining processing. The fluid circuit unit 40 supplies the staining solution 15 to the staining tank(s) used for the staining processing, in the staining solution amount V1 set in advance, under the control of the controller 50. The fluid circuit unit 40 does not supply the staining solution 15 to the staining tank(s) not used for the staining processing or supplies the staining solution 15 to the staining tank(s) not used for the staining processing with the supply amount of the staining solution reduced from the supply amount set in advance, under the control of the controller 50. Specifically, the controller 50 controls the fluid circuit unit 40 such that the amount V2 of the staining solution 15 supplied to the staining tank(s) not used for the staining processing satisfies 0≤V2<V1. This can reduce the amount of staining solution supplied to the staining tank(s) not used for the staining processing.

As an example of this control processing, FIG. 1 illustrates an example in which two of the three staining tanks 21 are the staining tanks 21 used for the staining processing and one of the three staining tanks 21 is the staining tank not used for the staining processing and in which the staining solution 15 is supplied to the staining tank not used for the staining processing in the staining solution amount V2 satisfying 0<V2<V1.

The staining solution amount V1 is set to such an amount that the regions in which the samples are applied on the glass slides 10 arranged in each staining tank 21 are arranged below a liquid level of the staining solution 15. The staining solution amount V2 may be such an amount that the regions in which the samples are applied on the glass sides 10 arranged in each staining tank 21 are arranged above the liquid level of the staining solution 15 and do not come into contact with the staining solution 15. The staining solution amount V2 may be equal to or less than a half of the staining solution amount V1. The smaller the staining solution amount V2 is, the higher the effect of reducing the consumption amount of the staining solution 15 is, and a smaller staining solution amount V2 is thus preferable. The staining solution amount V2 may be, for example, V2=0.

Meanwhile, after at least one of the staining tanks 21 is determined to be the staining tank(s) not used for the staining processing, the determined staining tank(s) 21 can be changed to the staining tank(s) used for the staining processing in response to a manipulation by the user. In this case, the controller 50 controls the fluid circuit unit 40 such that the fluid circuit unit 40 supplies the staining solution 15 to the corresponding staining tank(s) 21 in an amount corresponding to a difference between the staining solution amount V2 and the staining solution amount V1. In this case, the greater the staining solution amount V2 is, the smaller the difference between the staining solution amount V2 and the staining solution amount V1 is, and the shorter the time required to supply the staining solution 15 into the staining tank(s) 21 can be made.

The staining solution amount V1 and the staining solution amount V2 may be fixed values set in advance. The controller 50 can change the setting value of the staining solution amount V2 to any value within a range of 0<V2<V1 in response to a manipulation input by the user.

The aforementioned example is an example in which the staining tank(s) used for the staining processing is (are) determined depending on relationships among the time interval A in the transfer of the glass slides 10, the number B of glass slides 10 that can be held by each staining tank 21, and the staining time C in the staining tank 21. The controller 50 receives an input of the staining time C in the staining tank 21 made by a manipulation by the user. Then, the controller 50 determines the staining tank(s) used for the staining processing in response to the received staining time C.

The controller 50 may determine the staining tank(s) used for the staining processing and the staining tank(s) not used for the staining processing depending on a staining concentration received through a manipulation by the user. In this case, the controller 50 determines the staining tank(s) used for the staining processing and the staining tank(s) not used for the staining processing by calculating the staining time C corresponding to the staining concentration. For example, the controller 50 sets the number of staining tanks used for the staining processing such that the lower the staining concentration is, the smaller the number of staining tanks used for the staining processing is.

Alternatively, the controller 50 may, for example, receive the number of staining tanks used for the staining processing through a manipulation by the user. The controller 50 determines the staining tank(s) used for the staining processing and the staining tank(s) not used for the staining processing depending on the received number of staining tanks used for the staining processing. In this case, for example, the user may set the staining time C within a range of an upper limit value corresponding to the number of staining tanks used for the staining processing.

Moreover, the controller 50 may receive a staining method through a manipulation by the user. The controller 50 determines the staining tank(s) used for the staining processing and the staining tank(s) not used for the staining processing depending on the types and numbers of the staining solutions 15 used in the received staining method. For example, when two different types of staining solutions 15 are used in a certain staining method, the controller 50 may determine that two of the three staining tanks 21 are the staining tanks 21 to be used for the staining processing and one of the three staining tanks 21 is the staining tank not used for the staining processing. For example, the user may set the staining time C within a range of an upper limit value corresponding to the number of staining tanks used for the staining processing.

Due to the aforementioned configuration, in the smear preparing apparatus 100 according to an embodiment, the controller 50 can determine the staining tank(s) used for the staining processing and the staining tank(s) not used for the staining processing from the staining tanks 21 in response to the manipulation by the user. The smear preparing apparatus 100 can thereby transfer the glass slides 10 to the staining tank(s) used for the staining processing at the predetermined time intervals and perform the staining processing without using the staining tank(s) not used for the staining processing. Thus, the smear preparing apparatus 100 does not have to supply the staining solution 15 to the staining tank(s) not used for the staining processing in the amount necessary for the staining processing and the amount of the staining solution supplied to the staining tank(s) not used for the staining processing can be reduced. Moreover, assume a case where the controller 50 determines not to use some of the staining tanks 21. In this case, if the processing speed is to decrease due to non-use of any of the staining tanks 21, the processing speed can be maintained by increasing the number of staining tanks used for the staining processing because the actual number of the staining tanks 21 is not reduced. As a result, it is possible to reduce the consumption amount of the staining solution 15 while maintaining the processing speed in the smear preparation.

(Smear Preparing Method)

Next, a smear preparing method in an embodiment is described with reference to FIGS. 1 and 2.

The smear preparing method of an embodiment is a smear preparing method in which the staining processing is performed by immersing the samples smeared on the glass slides 10 in the staining solution 15 accommodated in the staining unit 20 including the staining tanks 21 that are designed to receive the glass slides 10 smeared with the samples and that can accommodate the staining solution 15. The smear preparing method is performed by executing the aforementioned staining operation of the smear preparing apparatus 100.

The smear preparing method of an embodiment includes at least the steps S1 and S3 described below. The smear preparing method of an embodiment may further include step S2 described below. (S1) The staining tank(s) used for the staining processing among the staining tanks 21 is (are) determined in response to the manipulation by the user. (S2) A predetermined amount of the staining solution 15 is supplied to the staining tank(s) used for the staining processing among the staining tanks 21 and no staining solution 15 or a smaller amount of the staining solution 15 than the amount of the staining solution supplied to the staining tank(s) used for the staining processing is supplied to the staining tank(s) not used for the staining processing. (S3) The staining processing is performed by transferring the glass slides 10 to the staining tank(s) used for the staining processing.

Specifically, as illustrated in FIG. 2, in step S1, the staining tank(s) used for the staining processing among the staining tanks 21 is (are) determined. The staining tank(s) used for the staining processing is (are) determined in response to the staining time C, the number of staining tanks used for the staining processing, the user manipulations on the setting of the staining method and the like, as described above. As a result, the staining tank(s) used for the staining processing and the staining tank(s) not used for the staining processing among the staining tanks 21 are determined. The staining tanks 21 of the staining unit 20 are categorized into two groups of the staining tank(s) used for the staining processing and the staining tank(s) not used for the staining processing.

Step S2 is described while being divided into steps S2A and S2B. In step S2A, the staining solution amount V1 of the staining solution 15 is supplied to the staining tank(s) 21 determined to be used for the staining processing in step S1 among the staining tanks 21. In step S2B, the amount V2 of the staining solution supplied to the staining tank(s) 21 determined not to be used for the staining processing in step S1 among the staining tanks 21 is set smaller than the amount V1 of the staining solution supplied to the staining tank(s) used for the staining processing. Since the staining solution amount V2 can include zero, no staining solution 15 may be supplied to the staining tank(s) not used for the staining processing in step S2B. The staining solution amount for the staining tank(s) not used for the staining processing can be thus reduced.

In step S3, the staining processing is performed by transferring the glass slides 10 at the predetermined transfer time intervals A to the staining tank(s) 21 which is (are) determined to be used for the staining processing and to which the staining solution amount V1 of the staining solution 15 is supplied.

Due to this configuration, in the smear preparing method of an embodiment, the staining tank(s) used for the staining processing and the staining tank(s) not used for the staining processing in the staining tanks 21 can be determined in response to the manipulation by the user as described above. The staining processing can be thereby performed by transferring the glass slides 10 to the staining tank(s) used for the staining processing at the predetermined time intervals without using the staining tank(s) not used for the staining processing. Thus, there is no need to supply the staining solution 15 to the staining tank(s) not used for the staining processing in the amount necessary for the staining processing and the amount of the staining solution supplied to the staining tank(s) not used for the staining processing can be reduced. Moreover, assume a case where some of the staining tanks 21 are determined not to be used. In this case, if the processing speed is to decrease due to non-use of any of the staining tanks 21, the processing speed can be maintained by increasing the number of staining tanks used for the staining processing because the actual number of the staining tanks 21 is not reduced. As a result, it is possible to reduce the consumption amount of the staining solution 15 while maintaining the processing speed in the smear preparation.

(Configuration Example of Smear Preparing Apparatus)

A specific configuration example of the smear preparing apparatus 100 of an embodiment is described below with reference FIGS. 3 to 14.

<Overall Configuration>

Figure 3:
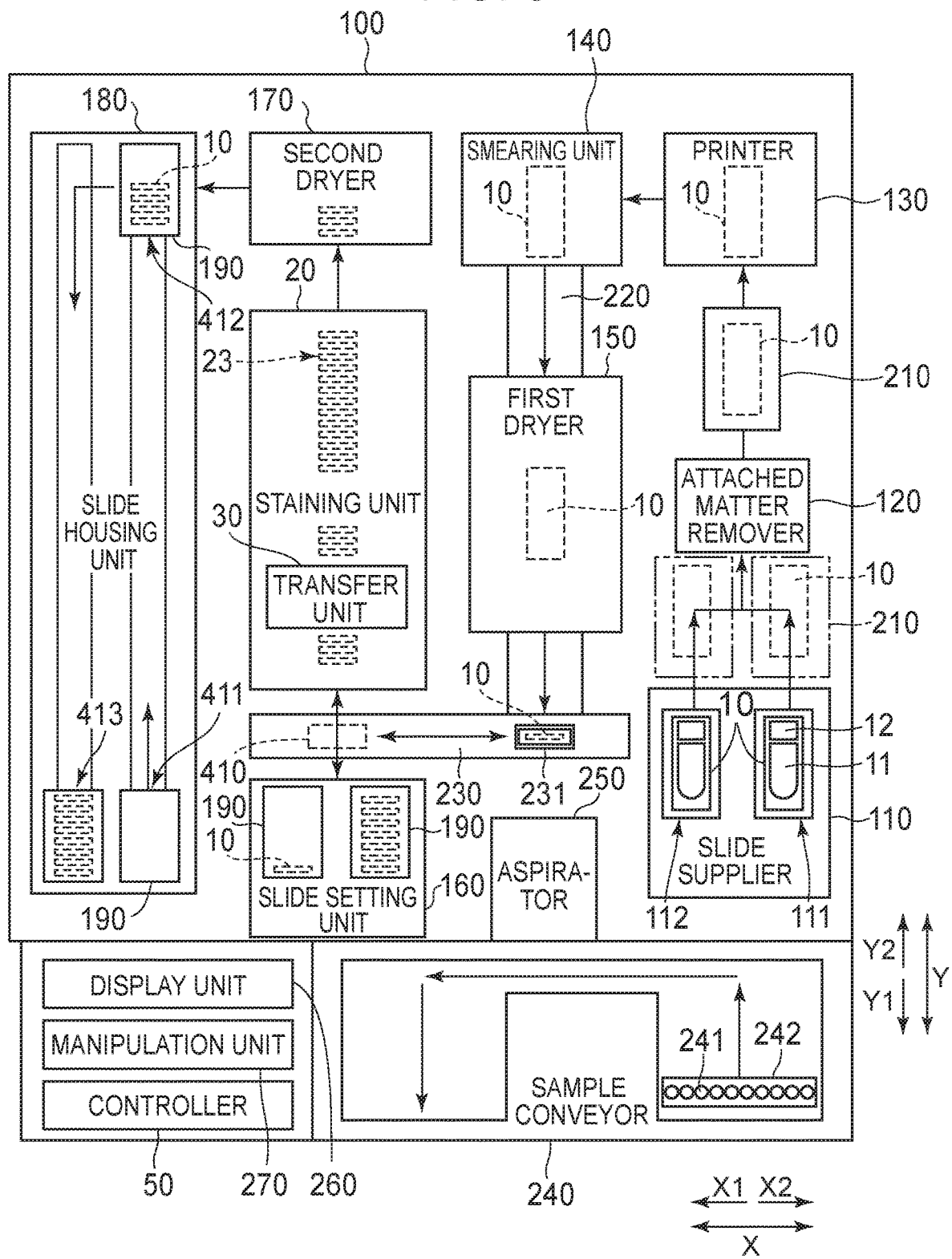
FIG. 3 is a plan diagram illustrating a configuration example of a smear preparing apparatus.

As illustrated in FIG. 3, the smear preparing apparatus 100 includes, in addition to the staining unit 20, a slide supplier 110, an attached matter remover 120, a printer 130, a smearing unit 140, a first dryer 150, a slide setting unit 160, a second dryer 170, and a slide housing unit 180. In a configuration example of FIG. 3, the smear preparing apparatus 100 includes, in addition to the transfer unit 30, a first slide conveyor 210, an unloading mechanism 220, and a second slide conveyor 230 as mechanisms that convey the glass slides 10. Ina configuration example of FIG. 3, the smear preparing apparatus 100 further includes a sample conveyor 240, an aspirator 250, a display unit 260, and a manipulation unit 270. The controller 50 controls the units included in the smear preparing apparatus 100.

In the following description, two directions orthogonal to each other in a plane parallel to an installation surface of the smear preparing apparatus 100 (that is, a horizontal plane) are referred to as X direction and Y direction. The X direction is referred to as a left-right direction of the smear preparing apparatus 100 and the Y direction is referred to as a front-back direction of the smear preparing apparatus 100. An Y1 direction side is the front side of the apparatus and an Y2 direction side is the back side of the apparatus. Moreover, an up-down direction orthogonal to the horizontal plane is referred to as Z direction.

The sample conveyor 240 conveys sample containers 241 housing the samples to a predetermined take-in position. The sample conveyor 240 conveys, for example, a sample rack 242 holding the sample containers 241. The aspirator 250 aspirates a liquid sample such as blood or urine from each of the sample containers 241 conveyed to the take-in position by the sample conveyor 240. The aspirator 250 supplies the aspirated sample to the smearing unit 140.

The slide supplier 110 includes a first supplier 111 and a second supplier 112. The slide supplier 110 can house many unused glass slides 10 unsmeared with the samples in each of the first supplier 111 and the second supplier 112. The glass slides 10 are horizontally housed inside the first supplier 111 and the second supplier 112 such that smearing surfaces thereof face upward. The slide supplier 110 sends out the glass slides 10 one by one in the Y2 direction with the glass slides 10 arranged in a horizontal posture and hands over the glass slides 10 to the first slide conveyor 210.

In a configuration example of FIG. 3, the first slide conveyor 210 is provided to convey the glass slides 10 by moving between any two of the slide supplier 110, the attached matter remover 120, the printer 130, and the smearing unit 140. The first slide conveyor 210 can convey one glass slide 10 by holding it on the upper surface in the horizontal posture. The first slide conveyor 210 can receive the glass slide 10 from the slide supplier 110. The first slide conveyor 210 is movable in the horizontal direction (XY direction) and the up-down direction (Z direction). The first slide conveyor 210 can convey the held glass slide 10 to processing positions of the attached matter remover 120, the printer 130, and the smearing unit 140. Each glass slide 10 is subjected to predetermined processing in the attached matter remover 120, the printer 130, and the smearing unit 140 while being held by the first slide conveyor 210.

The attached matter remover 120 has a function of removing matters attached to the surface of each glass slide 10. For example, the attached matter remover 120 discharges air to blow away the attached matters in a smear region 11 and a print region 12 of the glass slide 10. The attached matters are, for example, small foreign objects such as glass powder and dust.

The printer 130 can print various pieces of information such as sample information in the print region 12 of the glass slide 10. The printer 130 performs printing on the glass slide 10 held on the upper surface of the first slide conveyor 210. The printer 130 includes, for example, a print head of a thermal transfer printer, an inkjet printer, or the like.

The smearing unit 140 can smear the sample onto the smear region 11 of each glass slide 10. The smearing unit 140 smears the sample onto the glass slide 10 held on the upper surface of the first slide conveyor 210. The smearing unit 140 performs smearing processing on the glass slide 10 by employing a smearing method in which the sample supplied from the aspirator 250 is dropped in the smear region 11 of the glass slide 10 and a smearing member such as a spreader glass is used (so-called wedge method). The smearing unit 140 includes a drive mechanism having a motor used to move the smearing member and a nozzle used to drop the sample.

The unloading mechanism 220 has a function of unloading each glass slide 10, conveyed to the smearing unit 140, to the first dryer 150. The unloading mechanism 220 moves the glass slide 10, conveyed to the smearing unit 140, in the Y1 direction and arranges the glass slide 10 at the processing position of the first dryer 150.

The first dryer 150 has a function of receiving each glass slide 10 smeared with the sample from the smearing unit 140 and blowing air to the smear region 11 of the glass slide 10. The first dryer 150 includes an air blowing mechanism such as a fan or a blower. The first dryer 150 can dry the sample smeared onto the glass slide 10 by blowing air.

The unloading mechanism 220 unloads the glass slide 10, unloaded to the first dryer 150, from the first dryer 150 to the second slide conveyor 230. The unloading mechanism 220 moves the glass slide 10, conveyed to the first dryer 150, in the Y1 direction and hands over the glass slide 10 to the second slide conveyor 230.

The second slide conveyor 230 is arranged between the slide setting unit 160 and a set of the first dryer 150 and the staining unit 20 in the Y direction and is provided to extend in the X direction. The second slide conveyor 230 conveys each glass slide 10 in the X1 direction from the first dryer 150 to a take-out position 410 between the staining unit 20 and the slide setting unit 160. The second slide conveyor 230 includes a housing portion 231 that houses the glass slide 10, and can move the housing portion 231 in the X direction. The second slide conveyor 230 receives the glass slide 10 laid substantially parallel to the installation surface in the housing portion 231 and conveys the glass slide 10 to the take-out position 410 while causing the glass slide 10 to stand substantially perpendicular to the installation surface. At the take-out position 410, the glass slide 10 is held with the smear surface thereof standing to extend in the up-down direction (Z direction). The glass slide 10 conveyed to the take-out position 410 is conveyed to the staining unit 20 or the slide setting unit 160.

The staining unit 20 is arranged side by side with the first dryer 150 on the X1 direction side thereof. The staining unit 20 is provided to extend in the Y direction. The staining unit 20 includes, in addition to the staining tanks 21 (see FIG. 4) used to accommodate the staining solution, cleaning tanks 25 (see FIG. 4) used to accommodate a cleaning liquid. The staining unit 20 performs staining processing and cleaning processing on the glass slides 10 subjected to smearing, in the staining tanks 21 and the cleaning tanks 25.

The slide setting unit 160 is arranged on the Y1 direction side of the staining unit 20 and holds the glass slides 10 in such a way that the glass slides 10 can be taken in and out.

Slide housing containers 190 capable of housing the glass slides 10 can be set in the slide setting unit 160. The slide housing containers 190 can be removed from the slide setting unit 160. The slide setting unit 160 holds the glass slides 10 in the slide housing containers 190 set in the slide setting unit 160 in such a way that the glass slides 10 can be taken in and out.

The transfer unit 30 can convey each glass slide 10 between any two of the staining unit 20, the slide setting unit 160, and the take-out position 410. The transfer unit 30 can move in the X direction, the Y direction, and the Z direction at a height position above the staining unit 20, the slide setting unit 160, and the take-out position 410. The transfer unit 30 can grab and take out the glass slide 10 arranged at any of the staining unit 20, the slide setting unit 160, and the take-out position 410 and set the glass slide 10 in any of the staining unit 20, the slide setting unit 160, and the take-out position 410.

The transfer unit 30 can convey each glass slide 10 to the second dryer 170 and the slide housing unit 180. Conveyance of the glass slide 10 to the second dryer 170 and the slide housing unit 180 may be performed by another conveyor different from the transfer unit 30.

In a configuration example of FIG. 3, the second dryer 170 is arranged side by side with the staining unit 20 on the Y2 direction side thereof. The second dryer 170 receives the glass slide 10 subjected to the staining processing and conveyed from the staining unit 20. The second dryer 170 has a function of blowing air to dry the glass slide 10 stained by the staining unit 20. The second dryer 170 includes an air blowing mechanism such as a fan or a blower. The transfer unit 30 hands over the dried glass slide 10 to the slide housing unit 180.

The slide housing unit 180 has a function of receiving and housing the glass slides 10 processing for which is completed. In a configuration example of FIG. 3, the slide housing unit 180 is arranged side by side with the second dryer 170 on the X1 direction side thereof and receives the glass slides 10 conveyed from the second dryer 170.

The slide housing containers 190 can be set in the slide housing unit 180. The slide housing unit 180 holds the glass slides 10 in the slide housing containers 190 set in the slide housing unit 180. The slide housing unit 180 moves the empty slide housing container 190 set at a setting position 411, to a housing position 412 in the Y2 direction. The housing position 412 is a position adjacent to and on the X1 direction side of the second dryer 170. The transfer unit 30 sets the glass slides 10 from the second dryer 170 into the slide housing container 190 at the housing position 412. The slide housing unit 180 moves the slide housing container 190 housing the glass slides 10 in the X1 direction and then moves the slide housing container 190 in the Y1 direction to a collection position 413. The slide housing containers 190 housing the glass slides 10 for which the staining processing and the drying processing are completed are held to be aligned side by side in the Y2 direction from the collection position 413.

The controller 50 controls the operations of the units in the smear preparing apparatus 100. The controller 50 receives manipulations by the user through the manipulation unit 270. The controller 50 displays various screens relating to the operations of the smear preparing apparatus 100 such as a setting screen and a status display screen, on the display unit 260. The display unit 260 is, for example, a display device such as a liquid crystal monitor. The manipulation unit 270 is, for example, a touch panel provided in the display unit 260. The manipulation unit 270 may include input devices such as a mouse and a keyboard.

In the aforementioned configuration, the smear preparing apparatus 100 can automatically prepare the smears by performing processing of the printing processing, the sample smearing processing, and the staining processing on the glass slides 10.

(Staining Unit)

Next, a configuration of the staining unit 20 is specifically described.

Figure 4:
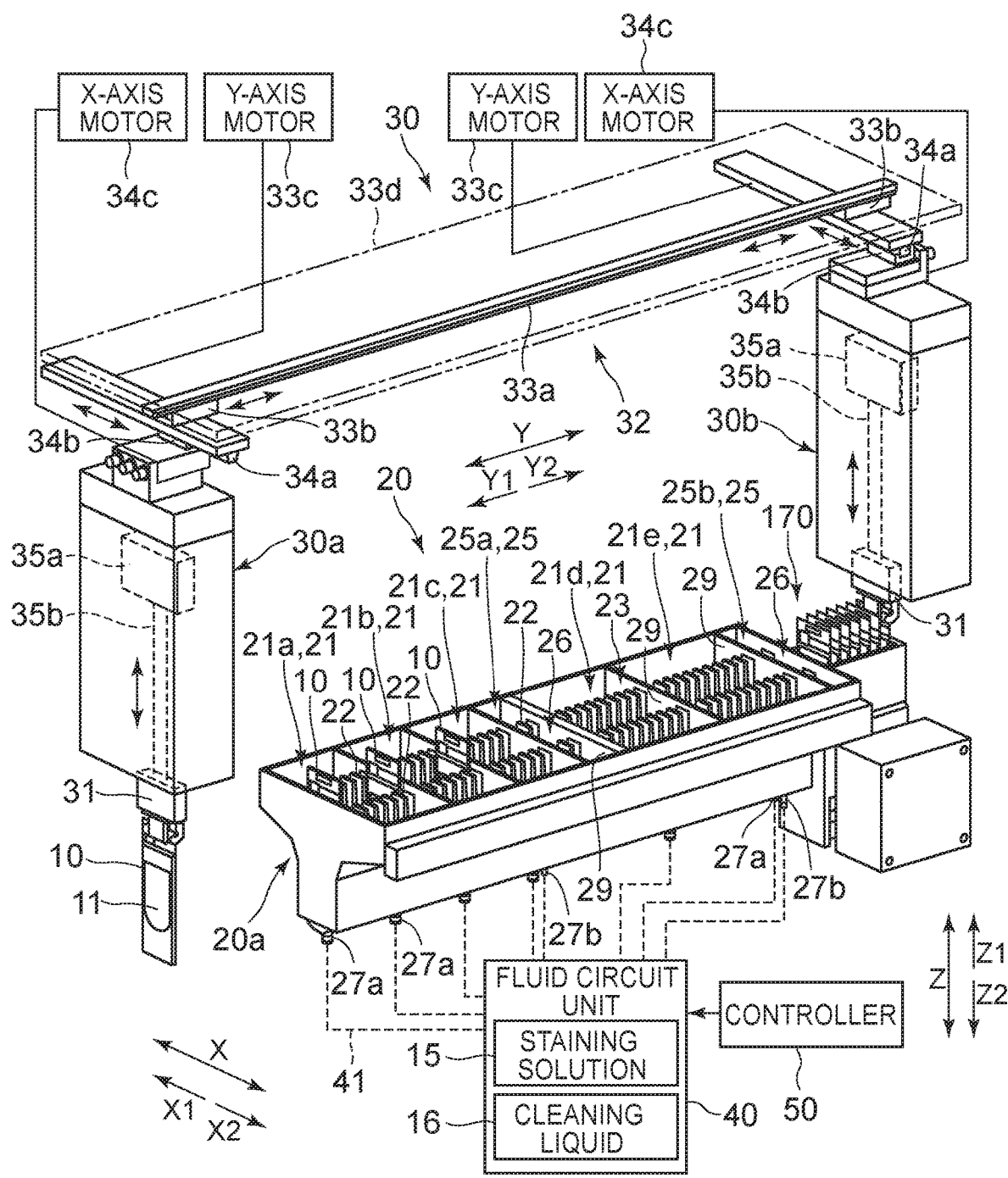
FIG. 4 is a perspective diagram illustrating a configuration example of a staining unit.

In a configuration example of FIG. 4, the staining unit 20 includes five staining tanks 21a to 21e. Moreover, the staining unit 20 further includes two cleaning tanks 25a and 25b.

In a configuration example of FIG. 4, the five staining tanks 21a to 21e and the two cleaning tanks 25a and 25b are integrally formed in a single structure 20a. The structure 20a is a liquid container with such a size that the five staining tanks 21a to 21e and the two cleaning tanks 25a and 25b are aligned in the Y direction and a recess-shaped accommodating space capable of accommodating liquid is formed in the structure 20a. The single structure 20a includes many holders 22 arranged in the Y direction. The holders 22 form the insertion regions 23 for the glass slides 10. Partitioning members 29 divide the recess-shaped accommodating space in the structure 20a into the five staining tanks 21a to 21e and the two cleaning tanks 25a and 25b. Specifically, total of six plate-shaped partitioning members 29 partitioning the tanks from one another are provided at predetermined positions in the Y direction. The five staining tanks 21 and the two cleaning tanks 25 are thereby integrally formed to be aligned in the Y direction in the single structure 20a. The single structure 20a is favorably made of a resin material or the like resistant to chemicals and easy to clean.

The holders 22 in the staining tanks 21 form the insertion regions 23 in the staining tanks 21 and the holders 22 in the cleaning tanks 25 form insertion regions 26 in the cleaning tanks 25. Note that the numbers of the staining tanks 21 and the cleaning tanks 25 may be set depending on the number of steps in the staining processing.

The staining tanks 21a to 21e and the cleaning tanks 25a and 25b are isolated from one another by the partitioning members 29 and no liquid flows from one tank to another tank. Each of the staining tanks 21a to 21e and the cleaning tanks 25a and 25b is provided with a supply port 27a used to supply liquid into the tank and a discharge port 27b used to discharge the liquid from the tank. The staining solution 15 or the cleaning liquid 16 can be thereby supplied to or discharged from each of the staining tanks 21a to 21e and the cleaning tanks 25a and 25b individually. The staining tanks 21a to 21e and the cleaning tanks 25a and 25b can be provided as separate bodies.

Due to such a configuration, the cleaning tanks 25 can accommodate the cleaning liquid 16 used to clean the samples smeared on the glass slides 10. The cleaning tanks 25 can accommodate the cleaning liquid 16 such that the glass slides 10 are immersed in the cleaning liquid 16. The same configuration as that of the staining tanks 21 can be employed as the configuration of the cleaning tanks 25. The cleaning tanks 25 are formed in a container shape and can accommodate the cleaning liquid 16 therein such that the glass slides 10 are immersed in the cleaning liquid 16. The cleaning tanks 25 can hold the glass slides 10 with the holders 22.

The staining tanks 21 and the cleaning tanks 25 are arranged in the order of the staining tank 21a, the staining tank 21b, the staining tank 21c, the cleaning tank 25a, the staining tank 21*d*, the staining tank 21*e*, and the cleaning tank 25*b* to the Y2 direction side. Each glass slide 10 is transferred to the tanks in order from the staining tanks 21*a* to the Y2 direction side. The glass slide 10 is processed by being immersed in the staining solution 15 or the cleaning liquid 16 accommodated in each tank for a predetermined time. The time of processing in each tank varies depending on the type of the staining solution 15 or the cleaning liquid 16 accommodated in the tank.

In a configuration example of FIG. 4, the transfer unit 30 includes a first transfer unit 30*a* and a second transfer unit 30*b*. The first transfer unit 30*a* and a second transfer unit 30*b* of the transfer unit 30 are both arranged above (on the Z1 direction side of) the staining tanks 21 and the cleaning tanks 25. Each of the first transfer unit 30*a* and the second transfer unit 30*b* can be moved in horizontal directions (specifically, X direction and Y direction) by a movement mechanism 32.

The movement mechanism 32 includes a Y-axis rail 33*a* and Y-axis sliders 33*b* that extend in the Y direction, X-axis rails 34*a* and X-axis sliders 34*b* that extend in the X direction, Y-axis motors 33*c*, and X-axis motors 34*c*. For example, stepper motors, servo motors, or the like can be employed as the Y-axis motors 33*c* and the X-axis motors 34*c*.

The Y-axis rail 33*a* extends in a linear shape in the Y direction and is fixed to a lower surface of a supporting member 33*d*. The supporting member 33*d* is a ceiling portion of a housing of the smear preparing apparatus 100, a support beam member, or the like. The Y-axis sliders 33*b* are attached on the lower surface side (Z2 direction side) of the Y-axis rail 33*a* and are movable along the Y-axis rail 33*a*. The Y-axis motors 33*c* move the Y-axis sliders 33*b* in the Y direction via not-illustrated transmission mechanisms. For example, belt-and-pulley mechanisms, rack-and-pinion mechanisms, or the like can be employed as the transmission mechanisms.

The X-axis rails 34*a* extend in a linear shape in the X direction and are fixed to lower surfaces of the Y-axis sliders 33*b*. The X-axis sliders 34*b* are attached on the lower surface side (Z2 direction side) of the X-axis rails 34*a* and are movable along the X-axis rails 34*a*. The X-axis motors 34*c* move the X-axis sliders 34*b* in the X direction via not-illustrated transmission mechanisms.

The Y-axis sliders 33*b*, the X-axis rails 34*a*, the X-axis sliders 34*b*, the X-axis motors 34*c*, and the Y-axis motors 33*c* are provided in pairs. The first transfer unit 30*a* is attached on the lower surface side of one of the X-axis sliders 34*b* and the second transfer unit 30*b* is attached on the lower surface side of the other X-axis slider 34*b*. The first transfer unit 30*a* and the second transfer unit 30*b* can thereby independently move in the X direction along the respective X-axis rails 34*a*. Moreover, the first transfer unit 30*a* and the second transfer unit 30*b* can independently move in the Y direction along the same Y-axis rail 33*a*.

The configurations of the first transfer unit 30*a* and the second transfer unit 30*b* are the same. Each of the first transfer unit 30*a* and the second transfer unit 30*b* includes the hand 31, a Z-axis motor 35*a* that lifts and lowers the hand 31, and a transmission mechanism 35*b*. The Z-axis motor 35*a* lifts and lowers the hand 31 via the transmission mechanism 35*b*. For example, a belt-and-pulley mechanism, a rack-and-pinion mechanism, or the like can be employed as the transmission mechanism 35*b*.

The hand 31 can grab one glass slide 10. In FIG. 4, the hand 31 grabs the glass slide 10 by holding it between portions of the hand 31. The hand 31 includes an actuator used for switching between gripping and non-gripping of the glass slide 10. An air cylinder, a motor, a solenoid, or the like can be employed as the actuator.

Figure 5:
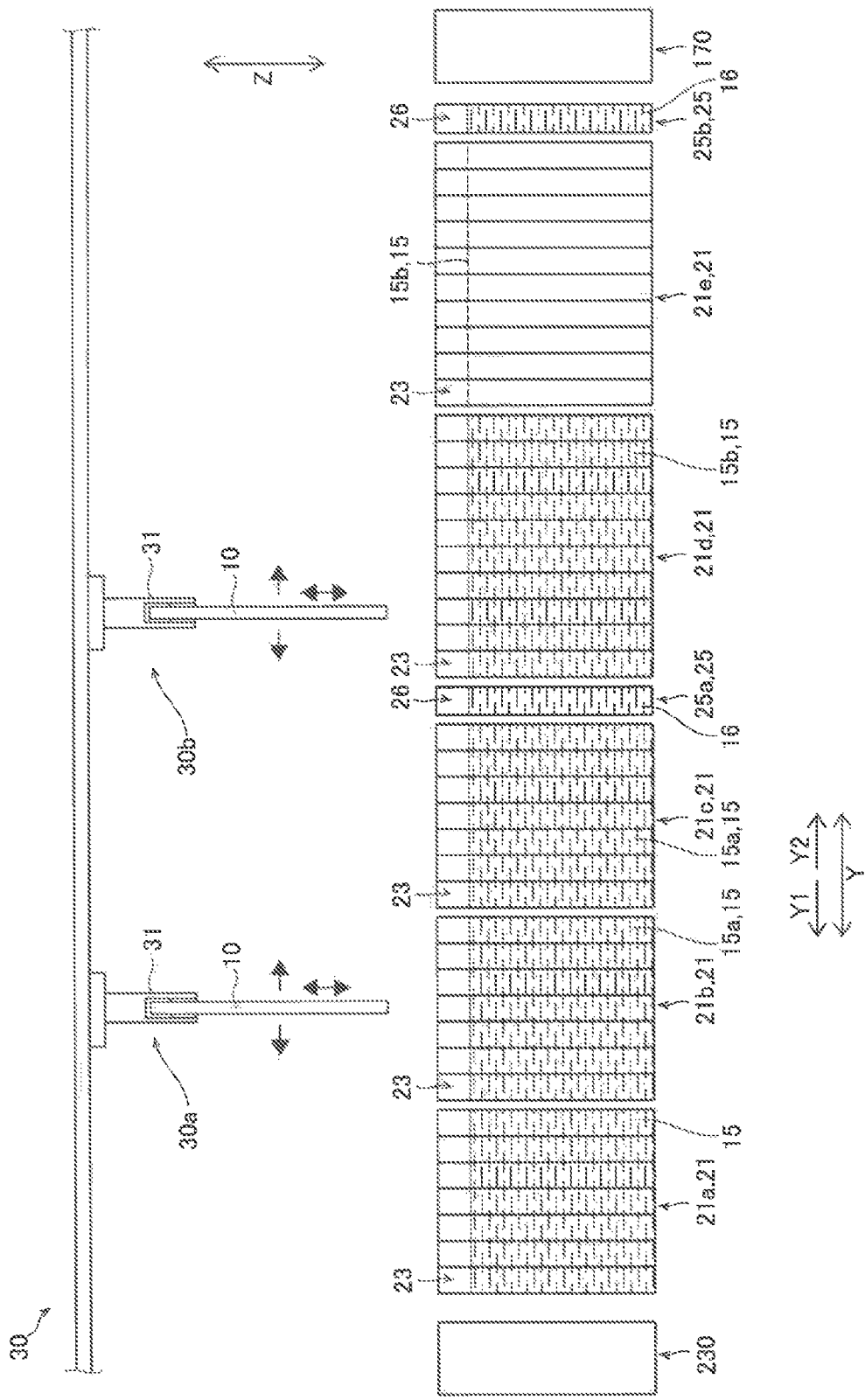
FIG. 5 is a schematic diagram illustrating a configuration example of staining tanks in a staining unit.

FIG. 5 schematically illustrates the insertion regions 23, 26 in the staining tanks 21*a* to 21*e* and the cleaning tanks 25*a* and 25*b*. In an example of FIG. 5, the staining tank 21*a* has seven insertion regions 23 and can hold seven glass slides 10 simultaneously. The staining tank 21*b* has seven insertion regions 23 and can hold seven glass slides 10 simultaneously. The staining tank 21*c* has seven insertion regions 23 and can hold seven glass slides 10 simultaneously. The cleaning tank 25*a* has one insertion region 26 and can hold one glass slide 10. The staining tank 21*d* has ten insertion regions 23 and can hold ten glass slides 10 simultaneously. The staining tank 21*e* has ten insertion regions 23 and can hold ten glass slides 10 simultaneously. The cleaning tank 25*b* has one insertion region 26 and can hold one glass slide 10.

The first transfer unit 30*a* can move to positions above the cleaning tank 21*a*, the staining tank 21*b*, the staining tank 21*c*, and the cleaning tank 25*a* on the Y1 direction side. Accordingly, the first transfer unit 30*a* can insert the glass slides 10 into and pull them out of the insertion regions 23, 26 in the staining tank 21*a*, the staining tank 21*b*, the staining tank 21*c*, and the cleaning tank 25*a* one by one.

Moreover, the second transfer unit 30*b* can move to positions above the cleaning tank 25*b*, the staining tank 21*e*, the staining tank 21*d*, and the cleaning tank 25*a* on the Y2 direction side, to a position above the second dryer 170 (see FIG. 3), and to the housing position 412 (see FIG. 3) of the slide housing unit 180. Accordingly, the second transfer unit 30*b* can insert the glass slides 10 into and pull them out from the insertion regions 23 and 26 in the staining tanks 21*d*, the staining tank 21*e*, the cleaning tank 25*a*, and the cleaning tank 25*b* one by one.

The first transfer unit 30*a* and the second transfer unit 30*b* can transfer separate glass slides 10, respectively, in parallel. The operation range of the first transfer unit 30*a* and that of the second transfer unit 30*b* overlap each other in the cleaning tank 25*a* and the glass slide 10 is handed over in the cleaning tank 25*a*. The position of the handing-over may be a position other than the cleaning tank 25*a*.

As described above, in a configuration example of FIGS. 4 and 5, the transfer unit 30 holds and transfers one glass slide 10 and takes the glass slides 10 in and out of the staining tanks 21 one by one. Moreover, the controller 50 controls the transfer unit 30 such that the transfer unit 30 transfers the glass slides 10 to the staining tanks 21 one by one and takes the glass slides 10 for which staining time of performing the staining processing has elapsed, out of the staining tanks 21 in order.

For example, in a configuration in which multiple glass slides 10 are transferred as a group, the staining processing cannot be started until preparation for all glass slides 10 are completed and there is a waiting time. Meanwhile, in the aforementioned configuration in which the glass slides 10 are transferred one by one, the staining processing can be started immediately when one glass slide 10 to be subjected to the staining processing is prepared. As a result, the waiting time from the start of the operation of the smear preparing apparatus 100 to the providing of the first stained smear to the user can be made as short as possible.

(Control Blocks)

Figure 6:
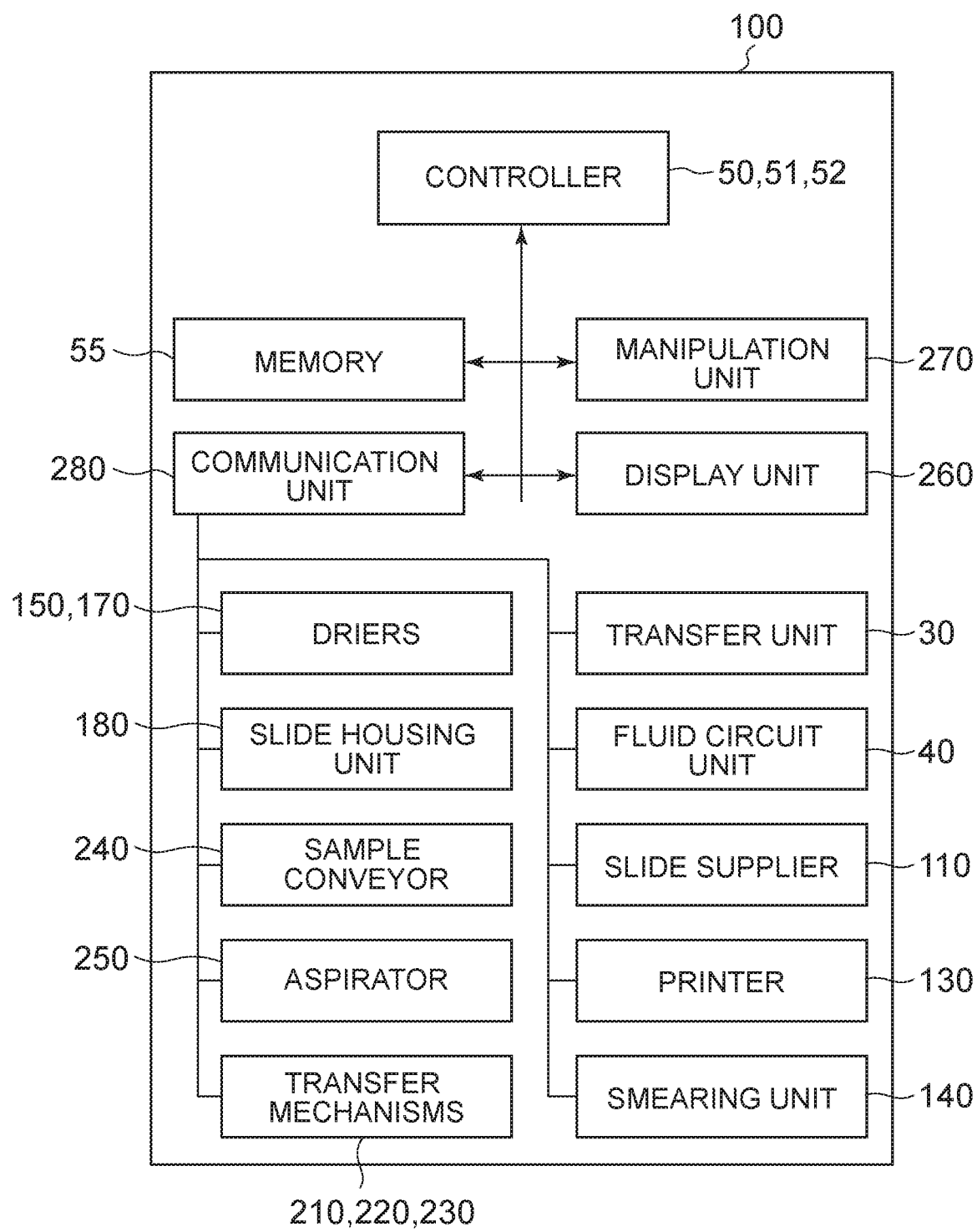
FIG. 6 is a block diagram illustrating a control configuration of a smear preparing apparatus.

As illustrated in FIG. 6, the controller 50 is electrically connected to a memory 55, the manipulation unit 270, the display unit 260, and a communication unit 280. The controller 50 controls the mechanisms included in the smear preparing apparatus 100 via the communication unit 280, based on a program and setting information stored in the memory 55.

The communication unit 280 includes an I/O interface that exchanges signals between the controller 50 and the mechanisms included in the smear preparing apparatus 100. The controller 50 is connected to the mechanisms such as the transfer unit 30, the fluid circuit unit 40, the slide supplier 110, the printer 130, the smearing unit 140, the dryers (first dryer 150 and second dryer 170), the slide housing unit 180, the sample conveyor 240, the aspirator 250, and the transfer mechanisms (first slide conveyor 210, unloading mechanism 220, and second slide conveyor 230) via the communication unit 280. The controller 50 controls supply operations and discharge operations of the staining solution 15 and the cleaning liquid 16 by the fluid circuit unit 40, via the communication unit 280. The controller 50 controls a transfer operation of the glass slides 10 by the transfer unit 30, via the communication unit 280.

(Example of Staining Processing)

In the example of FIG. 3, the smear preparing apparatus 100 can execute multiple types of staining processing. These multiple types of staining processing vary in at least one of the types of the used staining solution, the steps of the staining processing, the staining time, and the like. In an example illustrated in FIG. 7, the smear preparing apparatus 100 can perform three types of staining processing. Specifically, the smear preparing apparatus 100 can perform two types of double staining and one type of single staining. When the double staining is performed, the staining solution 15 includes a first staining solution 15a and a second staining solution 15b different from the first staining solution 15a.

The first type of staining processing is May-Giemsa staining which is double staining. When the May-Giemsa staining which is double staining is performed, the staining solution 15 includes methanol, May-Gruenwald's solution, and Giesma's solution. The first staining solution 15a is the May-Gruenwald's solution and the second staining solution 15b is the Giesma's solution. Methanol is supplied to the staining tank 21a, undiluted May-Gruenwald's solution is supplied to the staining tank 21b, and a diluted staining solution of May-Gruenwald's solution is supplied to the staining tank 21c. In other words, the staining tank 21b and the staining tank 21c are the staining tanks 21 accommodating the first staining solution 15a. A buffer solution such as phosphate buffer is supplied to the cleaning tank 25a as the cleaning liquid 16. Diluted staining solution Giesma's solution is supplied to the staining tanks 21d and 21e. In other words, the staining tanks 21d and 21e are the staining tanks 21 accommodating the second staining solution 15b. Pure water is supplied to the cleaning tank 25b as the cleaning liquid 16.

The second type of staining processing is Wright-Giesma staining which is double staining. When the Wright-Giesma staining which is double staining is performed, the staining solution 15 includes methanol, Wright's solution, and the Giesma's solution. The first staining solution 15a is the Wright's solution and the second staining solution 15b is the Giesma's solution. When the Wright-Giesma staining which is double staining is performed, methanol is supplied to the staining tank 21a, undiluted Wright's solution is supplied to the staining tank 21b, and diluted Wright's solution is supplied to the staining tank 21c. In other words, the staining tank 21b and the staining tank 21c are the staining tanks 21 accommodating the first staining solution 15a. The phosphate buffer is supplied to the cleaning tank 25a as the cleaning liquid 16 and the diluted Giesma's solution is supplied to the staining tanks 21d and 21e. In other words, the staining tanks 21d and 21e are the staining tanks 21 accommodating the second staining solution 15b. Pure water is supplied to the cleaning tank 25b as the cleaning liquid 16.

As described above, the staining unit 20 includes the staining tanks 21b and 21c that accommodate the first staining solution 15a and the staining tanks 21d and 21e that accommodate the second staining solution 15b different from the first staining solution 15a, and performs the first staining processing using the first staining solution 15a and then performs the second staining processing using the second staining solution 15b.

The third type of staining processing is Wright staining which is single staining. When the Wright staining which is single staining is performed, the staining solution 15 includes methanol and Wright's solution. When Wright staining which is single staining is performed, methanol is supplied to the staining tank 21a, undiluted Wright's solution is supplied to the staining tank 21b, diluted Wright's solution is supplied to the staining tanks 21c, 21d, and 21e, and pure water is supplied to the cleaning tank 25b as cleaning liquid 16. No cleaning liquid 16 is supplied to the cleaning tank 25a and the cleaning tank 25a is not used.

(Fluid Circuit Unit)

Figure 8:
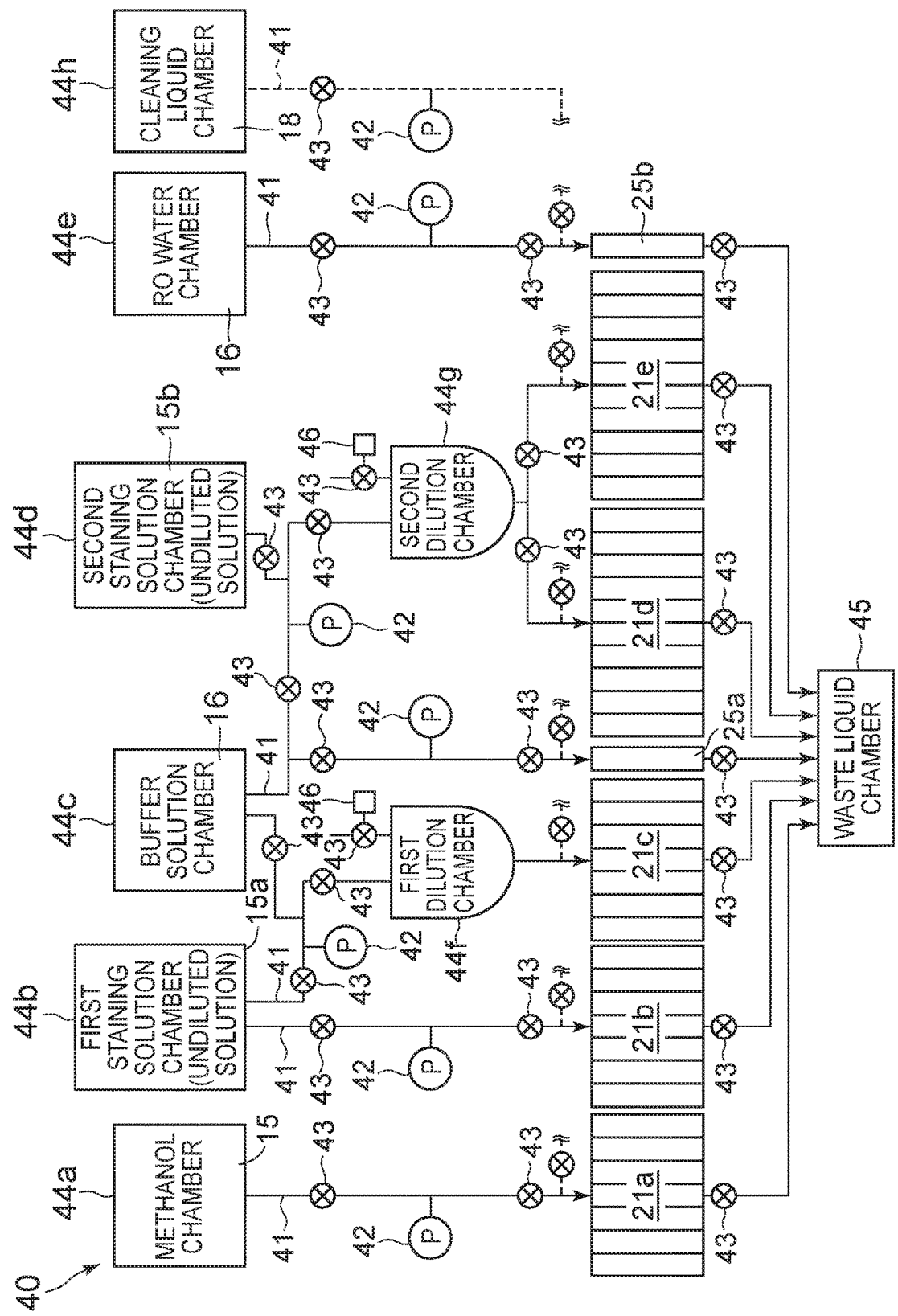
FIG. 8 is a schematic diagram illustrating an outline configuration of a fluid circuit unit.

FIG. 8 illustrates an outline of the fluid circuit unit 40 that supplies the staining solution 15 or the cleaning liquid 16 to each of the staining tanks 21a to 21e and the cleaning tanks 25a and 25b in the staining unit 20.

The fluid circuit unit 40 includes liquid delivery pipes 41, pumps 42, and valves 43, and chambers 44. The pumps 42 which are metering pumps such as diaphragm pumps or syringe pumps determine the quantity of the staining solution 15 and supply it to the staining tanks 21a to 21e. When the staining solution 15 is to be supplied as the diluted staining solution, the undiluted staining solution 15 and a diluent are supplied to a dilution chamber and the undiluted staining solution is diluted to a predetermined concentration in the dilution chamber. The pumps 42 which are metering pumps determine the quantity of the cleaning liquid 16 and supply it to the cleaning tanks 25a and 25b.

Specifically, the fluid circuit unit 40 supplies methanol stored in a methanol chamber 44a to the staining tank 21a by opening and closing the valves 43 and operating the pump 42. The fluid circuit unit 40 supplies the undiluted first staining solution 15a stored in a first staining solution chamber 44b to the staining tank 21b by opening and closing the valves 43 and operating the pump 42. The first staining solution is selected from May-Gruenwald's solution or Wright's solution as described above. The fluid circuit unit 40 supplies the undiluted first staining solution stored in the first staining solution chamber 44b and the buffer solution stored in a buffer solution chamber 44c to a first dilution chamber 44f by opening and closing the valves 43 and operating the pump 42. The quantity of the diluted staining solution of the first staining solution 15a is determined in the first dilution chamber 44f. The fluid circuit unit 40 supplies the diluted staining solution of the first staining solution 15a stored in the first dilution chamber 44f to the staining tank 21c by opening and closing the valve 43 and supplying positive pressure from a positive pressure source 46 to the first dilution chamber 44f by switching the valve 43. The fluid circuit unit 40 supplies the buffer solution stored in the buffer solution chamber 44c to the cleaning tank 25a by opening and closing the valves 43 and operating the pump 42. The buffer solution (phosphate buffer) is used as the diluent of the staining solution 15 and as the cleaning liquid 16.

The fluid circuit unit 40 supplies the undiluted second staining solution 15b stored in a second staining solution chamber 44d and the buffer solution stored in the buffer solution chamber 44c to a second dilution chamber 44g by opening and closing the valves 43 and operating the pump 42. The second staining solution 15b is selected from Giemsa's solution or Wright's solution as described above. The quantity of a diluted staining solution of the second staining solution 15b is determined in the second dilution chamber 44g. The fluid circuit unit 40 supplies the diluted staining solution of the second staining solution 15b stored in the second dilution chamber 44g to the staining tank 21d or to both of the staining tanks 21d and 21e by opening and closing the valves 43 and supplying positive pressure from the positive pressure source 46 to the second dilution chamber 44g by switching the valve 43. The fluid circuit unit 40 supplies pure water stored in a pure water chamber 44e to the cleaning tank 25b by opening and closing the valves 43 and operating the pump 42. Pure water is, for example, RO water.

The fluid circuit unit 40 discharges liquids accommodated in the staining tanks 21a to 21e and the cleaning tanks 25a and 25b to a waste liquid chamber 45 by opening and closing the valves 43.

Note that the fluid circuit unit 40 can supply cleaning liquid 18 for tank cleaning to the staining tanks 21 of the staining unit 20. The fluid circuit unit 40 can supply the cleaning liquid 18 for tank cleaning to the staining tanks 21a to 21e and the cleaning tanks 25a and 25b individually at timings such as shutdown of the smear preparing apparatus 100. For example, methanol, ethanol, sodium hypochlorite solution, or the like can be employed as the cleaning liquid 18 for tank cleaning.

(Supplying of Staining Solution)

Next, supplying of the staining solution 15 in an embodiment is described.

In an embodiment, as described above, the controller 50 determines the staining tank(s) used for the staining processing among the staining tanks 21, in response to the manipulation by the user. Then, the controller 50 controls the fluid circuit unit 40 such that the fluid circuit unit 40 supplies no staining solution or a smaller amount of the staining solution than the amount of the staining solution supplied to the staining tank(s) used for the staining processing, to the staining tank(s) not used for the staining processing among the staining tanks 21.

In an embodiment, the controller 50 controls the fluid circuit unit 40 such that the fluid circuit unit 40 supplies no staining solution 15 to the staining tank(s) not used for the staining processing. The liquid supply amount of the staining solution 15 to the staining tank(s) not used for the staining processing can be thereby set to zero. Thus, the consumption amount of the staining solution 15 can be most effectively reduced.

Figure 7:
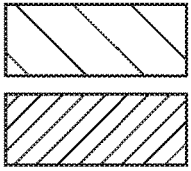
FIG. 7 is a diagram illustrating an example of staining processing performed by a smear preparing apparatus.

Moreover, in an embodiment, the staining unit 20 includes multiple staining tanks 21 to which the same type of staining solution 15 is supplied. For example, when the staining processing in double staining illustrated in FIG. 7 is performed, the same type of second staining solution 15b is supplied to the two tanks of the staining tanks 21d and 21e. When the staining processing in single staining illustrated in FIG. 7 is performed, the same type of staining solution 15 is supplied to the three tanks of the staining tanks 21c, 21d, and 21e. Moreover, the controller 50 determines the staining tank(s) used for the staining processing in the staining tanks 21 to which the same type of staining solution 15 is supplied.

When the staining processing is performed by using the same type of staining solution 15, the number of glass slides 10 that can be simultaneously held can be thereby adjusted by adjusting the number of staining tanks 21 to be used. As a result, when the number of glass slides 10 for which the staining processing is performed in parallel is small, the staining processing can be performed by using as few staining tanks 21 as possible.

Note that, in both of the double staining and the single staining illustrated in FIG. 7, the staining tanks 21a to 21e are arranged to be aligned in the order of staining processing in the staining unit 20. The controller 50 controls the transfer unit 30 such that the transfer unit 30 does not transfer the glass slides 10 to the staining tank(s) not used for the staining processing and transfers the glass slides 10 to the staining tank(s) used for the staining processing.

An operation of transferring the glass slides 10 to the staining tank(s) not used for the staining processing can be thereby skipped. As a result, when there is (are) the staining tank(s) not used for the staining processing, it is possible to avoid time loss caused by performing the transfer operation to the staining tank(s) 21 not used.

In an embodiment, when the staining processing of double staining is performed, the controller 50 determines whether to set only the staining tank 21d out of the staining tanks 21d and 21e as the staining tank used for the staining processing or to set both of the staining tanks 21d and 21e as the staining tanks used for the staining processing. When the staining processing of single staining is performed, the controller 50 determines whether to set only the staining tank 21c among the staining tanks 21c to 21e as the staining tank used for the staining processing, to set two staining tanks of the staining tanks 21c and 21d as the staining tanks used for the staining processing, or to set three staining tanks of the staining tanks 21c to 21e as the staining tanks used for the staining processing.

Moreover, when the staining processing uses multiple staining tanks 21 to which the same type of staining solution 15 is supplied, the controller 50 controls the transfer unit 30 such that the staining processing is performed in the used staining tanks 21 in parallel. For example, when both of the staining tanks 21d and the 21e are used in the staining processing of double staining, the controller 50 performs the staining processing in the staining tanks 21d and 21e in parallel. As described above, when there are multiple staining tanks used for the staining processing, the number of glass slides 10 that can be subjected to the staining processing in parallel can be increased and it is possible to avoid occurrence of the case where the glass slides 10 wait to be subjected to the staining processing. When the same staining processing is performed in multiple staining tanks 21, the staining processing can be simultaneously performed in the staining tanks 21 in parallel. Accordingly, maximum processing speed can be secured. Note that performing the staining processing in parallel means a state where different glass slides 10 are set in multiple staining tanks 21 and the staining processing is simultaneously performed on the glass slides 10 in the different staining tanks 21 in parallel. When the staining processing is performed in parallel, the setting timings and the take-out timings of the glass slides 10 may vary.

Next, description is given of a specific example of a method of determining the staining tank(s) used for the staining processing among the staining tanks 21 in response to the manipulation by the user.

In an embodiment, the controller 50 receives setting of the staining time made by a manipulation by the user. The controller 50 determines the staining tank(s) used for the staining processing in response to the duration of the set staining time C (see FIGS. 11 and 12).

The duration of the staining time C varies depending on the type of staining processing, that is the staining solution 15. When the glass slides 10 are transferred to the staining tank 21 at constant time intervals, the longer the staining time is, the greater the number of glass slides 10 held in the staining tank 21 is. Accordingly, it is possible to use multiple staining tanks 21 when the staining time is long and use one of the staining tanks 21 when the staining time is short by determining the staining tank(s) used for the staining processing in response to the duration of the staining time and thereby adjust the number of glass slides 10 that can be simultaneously held. As a result, the consumption amount of the staining solution 15 can be effectively reduced when any of the staining tanks 21 is not used in response to the duration of the staining time.

The controller 50 displays a setting screen on the display unit 260 (see FIG. 3) and receives the setting of the staining time made by the manipulation by the user through the setting screen. Specifically, the controller 50 displays a main menu screen 300 illustrated in FIG. 9 on the display unit 260. The user can select (touch) a setting button 301 provided in the main menu screen 300 by using the manipulation unit 270 and cause the controller 50 to display a setting screen for staining conditions in which the staining times can be set.

Figure 10:
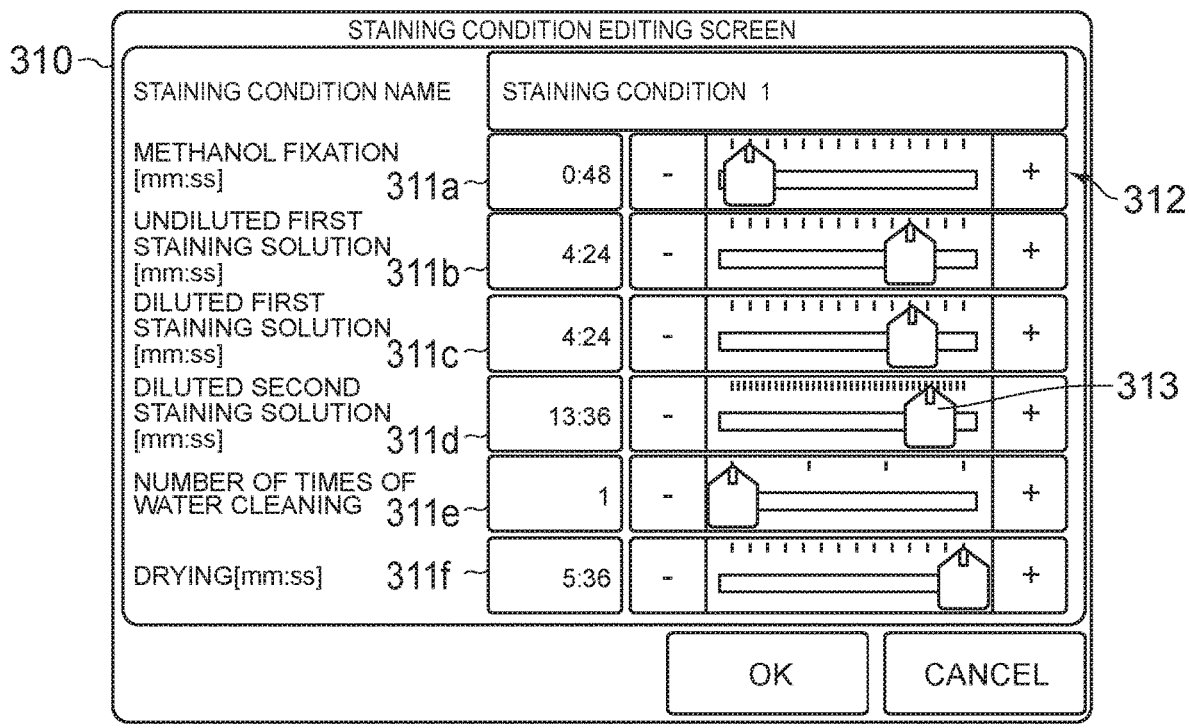
FIG. 10 is a diagram illustrating a staining condition editing screen.

Specifically, the controller 50 displays a staining condition editing screen 310 illustrated in FIG. 10 on the display unit 260 in response to the manipulation by the user. FIG. 10 illustrates an example of a screen in the case where the double staining is performed. The staining condition editing screen 310 includes a staining time item 311a for "methanol fixation" in the staining tank 21a, a staining time item 311b for "undiluted first staining solution" in the staining tank 21b, a staining time item 311c for "diluted first staining solution" in the staining tank 21c, a staining time item 311d for "diluted second staining solution" in the staining tanks 21d and 21e, item 311e of the number of times of water cleaning in the cleaning tank 25b, and a drying time item 311f in the second dryer 170. The staining times in the first staining processing using the first staining solution 15a are set in the staining time items 311b and 311c. The staining time in the second staining processing using the second staining solution 15b is set in the staining time item 311d. The staining time in the second staining processing in the staining time item 311d can be set longer than the staining times in the first staining processing in the staining time items 311b and 311c.

The staining condition editing screen 310 includes a slider-form setting input portion 312 for each setting item. Moving a slider 313 of each setting item toward the "+" side increases a setting value and moving the slider 313 toward the "−" side reduces the setting value. The user can thereby cause the setting values to be displayed and change the settings in the staining condition editing screen 310.

In an example of FIG. 10 in which the double staining is performed, the controller 50 obtains the setting value of the staining time item 311d (diluted second staining solution) which is the staining time in the second staining processing, as the manipulation by the user that is used to determine the staining tank(s) used for the staining processing. In an example of FIG. 10, the staining time of the staining time item 311d is set to a setting value of "13 minutes 36 seconds."

In an embodiment, the controller 50 sets the number of the staining tanks used for the staining processing such that the shorter the staining time is, the smaller the number of the staining tanks used for the staining processing is. When the double staining is performed, the number of staining tanks used for the staining processing is "2 (staining tanks 21d and 21e)" or "1 (only staining tank 21d)." When the staining time is equal to or less than a threshold, the controller 50 sets the number of staining tanks used for the staining processing to 1 and determines the staining tank 21d as the staining tank used for the staining processing. In other words, as illustrated in FIG. 11, when the staining time C is equal to or less than the threshold, the controller 50 determines the staining tank 21e as the staining tank not used for the staining processing. When the staining time C is more than the threshold, the controller 50 sets the number of staining tanks used for the staining processing to 2 and determines the staining tanks 21d and 21e as the staining tanks used for the staining processing.

This can reduce the number of staining tanks 21 to be used since the shorter the staining time is, the smaller the number of glass slides 10 that can be simultaneously held by the staining tanks 21 is. As a result, the consumption amount of the staining solution 15 can be effectively reduced.

The controller 50 sets the number of the staining tanks used for the staining processing such that the total number of the glass slides 10 that can be held by the staining tanks 21 is the minimum number equal to or greater than the number of glass slides 10 transferred to the staining tanks 21 in the staining time C (C/A).

This can make the number of staining tanks used for the staining processing as small as possible within a range in which waiting for the staining processing does not occur. Specifically, since as much staining tanks 21 as possible are set as the staining tanks not used for the staining processing within a range in which the processing speed can be maintained, the consumption amount of the staining solution 15 can be effectively reduced.

For example, the number B of the glass slides 10 than can be held is 10 in each of the staining tanks 21d and 21e illustrated in FIG. 5. Accordingly, the controller 50 sets the number of staining tanks used for the staining processing to "1" in a range in which the number of glass slides 10 transferred to the staining tanks 21 in the staining time C (C/A) is 1 to 10. The controller 50 sets the number of staining tanks used for the staining processing to "2" in a range in which (C/A) is 11 to 20. Assume that the time interval A in the transfer of the glass slides 10 by the transfer unit 30 is 48 [seconds]. In this case, (C/A) is equal to or less than 10 when the staining time C is equal to or less than 480 seconds (8 minutes), and is equal to or more than 11 when the staining time C is longer than 480 seconds. Thus, the controller 50 sets the threshold illustrated in FIG. 11 to 480 seconds (8 minutes) based on the number B of the glass slides 10 than can be held and the transfer time interval A.

As described above, in an embodiment, in the configuration in which the double staining is performed, the controller 50 determines the number of staining tanks 21 to be used for the second staining processing in response to the duration of the staining time C in the second staining processing. Specifically, the controller 50 determines whether to use only the staining tank 21d or to use both of the staining tanks 21d and 21e depending on the setting value of the staining time item 311d ("diluted second staining solution") illustrated in FIG. 10. Since the second staining processing generally takes longer time than the first staining processing in the double staining such as May (May-Gruenwald)-Giesma staining and Wright-Giesma staining, the number of glass slides 10 that can be held by the staining tanks 21 in the staining time C (C/A) varies greatly in response to the duration of the staining time in the second staining processing. Accordingly, determining the number of staining tanks 21 to be used in the second staining processing in response to the duration of the staining time in the second staining processing can reduce the number of staining tanks 21 to be used when the staining time in the second staining processing is short and thus reduce the consumption amount of the staining solution 15 while securing the maximum number of the glass slides 10 to be held.

Note that, in the single staining, two thresholds of a first threshold and a second threshold may be set. As illustrated in FIG. 12, the controller 50 sets the number of staining tanks used for the staining processing to "2 (staining tanks 21c and 21d)" when the staining time C is equal to or less than the first threshold, and sets the number of staining tanks used for the staining processing to "3 (staining tanks 21c to 21e)" when the staining time C is longer than the first threshold. When the transfer time interval A is 48 [seconds], the first threshold of the staining time C is set to, for example, 792 seconds (13 minutes 12 seconds) considering the time required to hand over the glass slides 10 between the first transfer unit 30a and the second transfer unit 30b.

When the staining time C is equal to or less than the second threshold (<first threshold), the controller 50 sets the number of staining tanks used for the staining processing to "1 (staining tank 21c)." The number B of glass slides 10 that can be held by the staining tanks 21c illustrated in FIG. 5 is seven. Accordingly, when the transfer time interval A is 48 [seconds], the second threshold of the staining time C is set to 336 seconds (5 minutes 36 seconds).

Note that the aforementioned numerical values of the thresholds, the transfer time interval A, and the number B of glass slides 10 that can be held are merely examples and are not limited to those described above as a matter of course.

(Status Screen Display) When there are the staining tank(s) used for the staining processing and the staining tank(s) not used for the staining processing in response to the staining time C, in some cases, the user wants to check presence or absence of the staining tank(s) not used for the staining processing during the operation of the smear preparing apparatus 100.

Accordingly, in an embodiment, the controller 50 performs display control on the display unit 260 such that, when there is (are) the staining tank(s) not used for the staining processing, the user can identify presence of the staining tank(s) used for the staining processing and the staining tank(s) not used for the staining processing.

Figure 13:
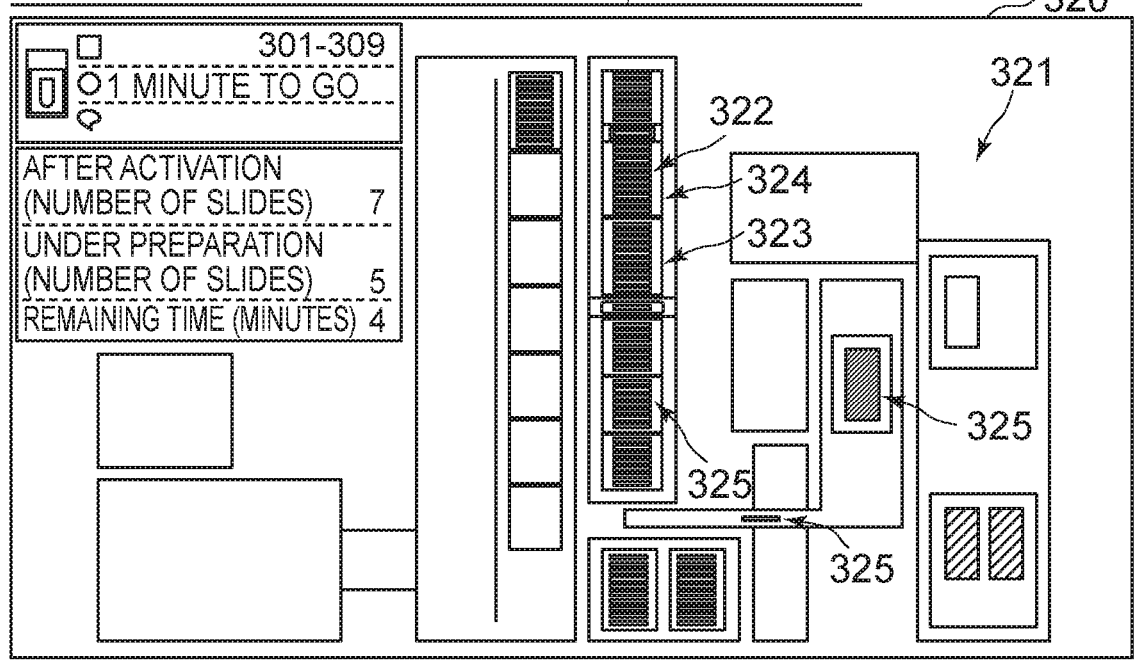
FIG. 13 is a diagram illustrating an example of a status display screen in a case where there is no staining tank not used for staining processing.
Figure 14:
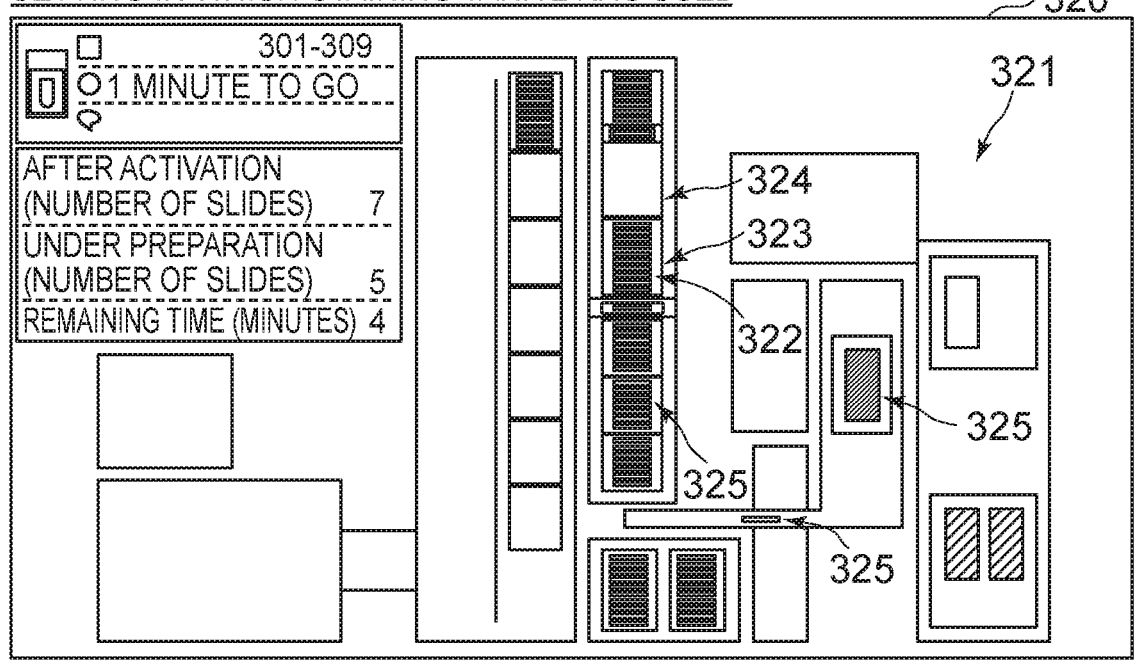
FIG. 14 is a diagram illustrating an example of a status display screen in a case where there is a staining tank not used for staining processing.

Specifically, when the user presses (touches) a status display button 302 provided in the main menu screen 300 by using the manipulation unit 270, the controller 50 displays a status display screen 320 illustrated in FIGS. 13 and 14, on the display unit 260.

The status display screen 320 includes a map 321 illustrating arrangement of main mechanisms of the smear preparing apparatus 100. In the map 321, display elements 325 indicating the positions of the glass slides 10 being processed are displayed to be colored and identifiable. For the staining unit 20, display elements 322 indicating the insertion regions 23 of the staining tanks 21a to 21e and the insertion regions 26 of the cleaning tanks 25a and 25b in the staining unit 20 are displayed in the map 321. As illustrated in FIG. 13, for example, when the controller 50 determines to use both of the staining tanks 21d and 21e for the staining processing in the double staining, the controller 50 displays the display elements 322 indicating the insertion regions 23 in both of a display element 323 indicating the staining tank 21d and a display element 324 indicating the staining tank 21e.

Meanwhile, as illustrated in FIG. 14, when the controller 50 determines to use the staining tank 21d for the staining processing and determines not to use the staining tank 21e for the staining processing in the double staining, the controller 50 displays the display elements 322 indicating the insertion regions 23 in the display element 323 indicating the staining tank 21d but does not display the display elements 322 indicating the insertion regions 23 in the display element 324 indicating the staining tank 21e.

As a result, the user can visually recognize that the staining tank 21e is the tank not used for the staining processing. The user can thereby grasp the staining tank(s) not used for the staining processing among the staining tanks 21, from the display of the display unit 260.

<Shutdown Processing>

Figure 9:
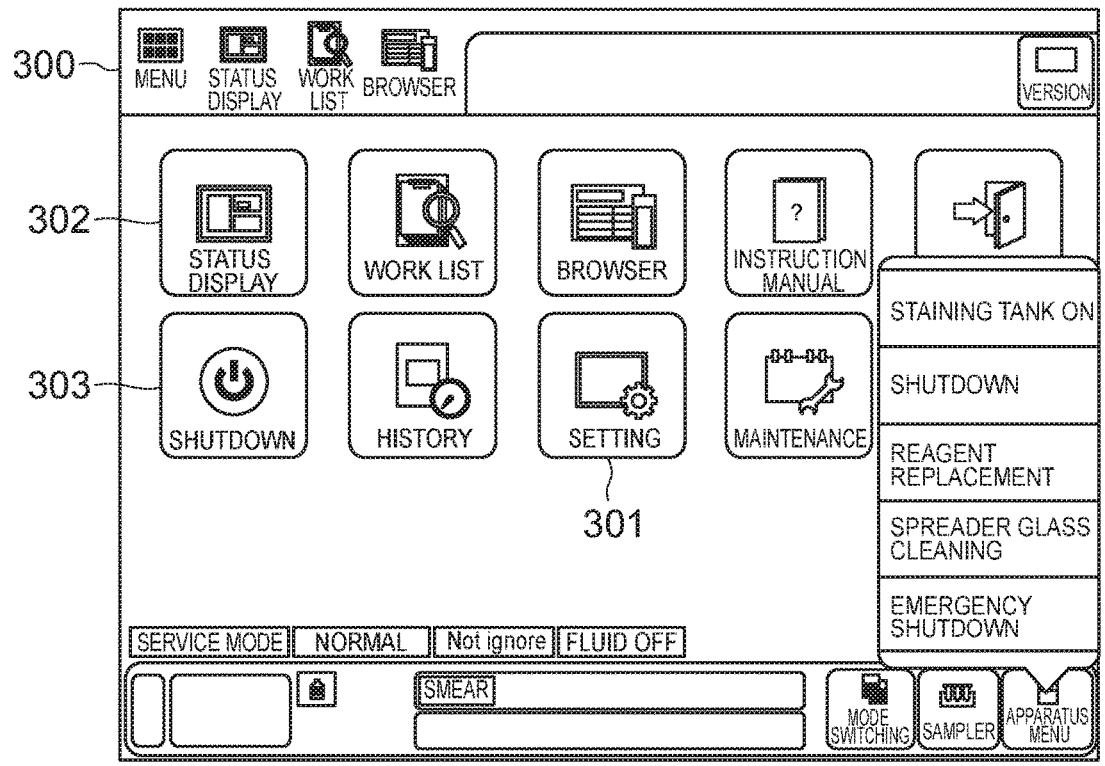
FIG. 9 is a diagram illustrating a main menu screen.

As illustrated in FIG. 9, when the user presses (touches) a shutdown button 303 provided in the main menu screen 300 by using the manipulation unit 270, the controller 50 executes shutdown processing. The controller 50 performs control of executing a cleaning operation of the staining tanks 21 and the cleaning tanks 25 in the staining unit 20 by using the cleaning liquid 18 for tank cleaning (see FIG. 8), as part of the shutdown processing.

In this case, as illustrated in FIGS. 11 and 12, the controller 50 controls the fluid circuit unit 40 such that an amount V4 of the cleaning liquid supplied to the staining tank(s) not used for the staining processing among the staining tanks 21 is smaller than an amount V3 of the cleaning liquid supplied to the staining tank(s) used for the staining processing among the staining tanks 21. A magnitude relationships between the amount V4 of the cleaning liquid supplied to the staining tank(s) not used for the staining processing and the amount V3 of the cleaning liquid supplied to the staining tank(s) used for the staining processing may be the same as that of the staining solution. Specifically, the cleaning liquid amount V4 may be equal to or less than a half of the cleaning liquid amount V3. The smaller the cleaning liquid amount V4 is, the higher the effect of reducing the consumption amount of the cleaning liquid 18 is, and a smaller cleaning liquid amount V4 is thus preferable. The cleaning liquid amount V4 may be, for example, V4=0.

Since the staining solution 15 in the staining tank(s) not used for the staining processing does not come into contact with the samples and the amount of the staining solution supplied to the staining tank(s) not used for the staining processing is small, the supplied liquid amount of the cleaning liquid 18 can be reduced in correspondence with the small staining solution amount. As a result, the consumption amount of the cleaning liquid 18 can be reduced in addition to the staining solution 15.

For example, the controller 50 controls the fluid circuit unit 40 such that the fluid circuit unit 40 does not supply the cleaning liquid 18 to the staining tank(s) not used for the staining processing. The supply liquid amount of the cleaning liquid 18 to the staining tank(s) not used for the staining processing can be thereby set to zero and the consumption amount of the cleaning liquid 18 can be most effectively reduced.

(Operations of Smear Preparing Apparatus)

Next, operations of the smear preparing apparatus 100 are described. In the following description, FIGS. 3 and 4 are referred to for the units of the smear preparing apparatus 100. An example in which the staining processing of double staining is performed is described below.

As described above, the smear preparing apparatus 100 illustrated in FIG. 3 can perform the printing processing with the printer 130, the smearing processing with the smearing unit 140, and the staining processing with the staining unit 20 on the unused glass slides 10 stored in the slide supplier 110. Moreover, the smear preparing apparatus 100 can take the smeared glass slides 10 out of the slide housing containers 190 set in the slide setting unit 160 and perform the staining processing with the staining unit 20 on the glass slides 10. The smear preparing apparatus 100 is capable of operating in four operations modes of a smearing staining mode, a staining mode, a smearing mode, and a printing mode by combining the aforementioned types of processing. The smear preparing apparatus 100 may be capable of operating in two operation modes of the smearing staining mode and the staining mode.

The smearing staining mode is an operation mode of performing the smearing processing on the unused glass slides 10 stored in the slide supplier 110 by using the samples aspirated by the aspirator 250 and performing the staining processing on the glass slides 10.

The staining mode is an operation mode of performing the staining processing on the glass slides 10 smeared and set in the slide setting unit 160 by the user and not performing the smearing processing and the printing processing on the glass slides 10.

The printing mode is an operation mode of performing the printing processing on the unused glass slides 10 stored in the slide supplier 110 and not performing the smearing processing and the staining processing on the glass slides 10.

The smearing mode is an operation mode of performing the smearing processing on the unused glass slides 10 stored in the slide supplier 110 by using the samples aspirated by the aspirator 250 and not performing the staining processing on the glass slides 10.

<Main Processing Flow>

Next, a main processing flow of the smear preparing apparatus 100 is described with reference to FIG. 15. When the user activates the smear preparing apparatus 100, the controller 50 executes the main processing flow illustrated in FIG. 15.

In step S101, the controller 50 controls the fluid circuit unit 40 such that the fluid circuit unit 40 performs the staining solution filling processing of supplying the staining solution 15 to the staining tanks 21a to 21e of the staining unit 20. The fluid circuit unit 40 supplies the staining solution 15 to the staining tanks 21a to 21d or to the staining tanks 21a to 21e and supplies the cleaning liquid 16 to the cleaning tanks 25a and 25b in the staining solution filling processing.

When the staining solution filling processing is completed, the smear preparing apparatus 100 switches to a standby state of receiving a mode selection from a user. Specifically, in step S102, the controller 50 causes the display unit 260 to display a mode selection screen 330 illustrated in FIG. 16. The mode selection screen 330 includes four mode selection buttons of a smearing staining mode button 331, a staining mode button 332, a printing mode button 333, and a smearing mode button 334. The mode selection screen 330 includes an OK button 335 and a cancel button 336. When the user presses any of the mode selection buttons and presses the OK button 335 by using the manipulation unit 270, the mode selection is received. When the user presses the cancel button 336, the display of the mode selection screen 330 is cancelled and switches to the main menu screen 300.

Figure 15:
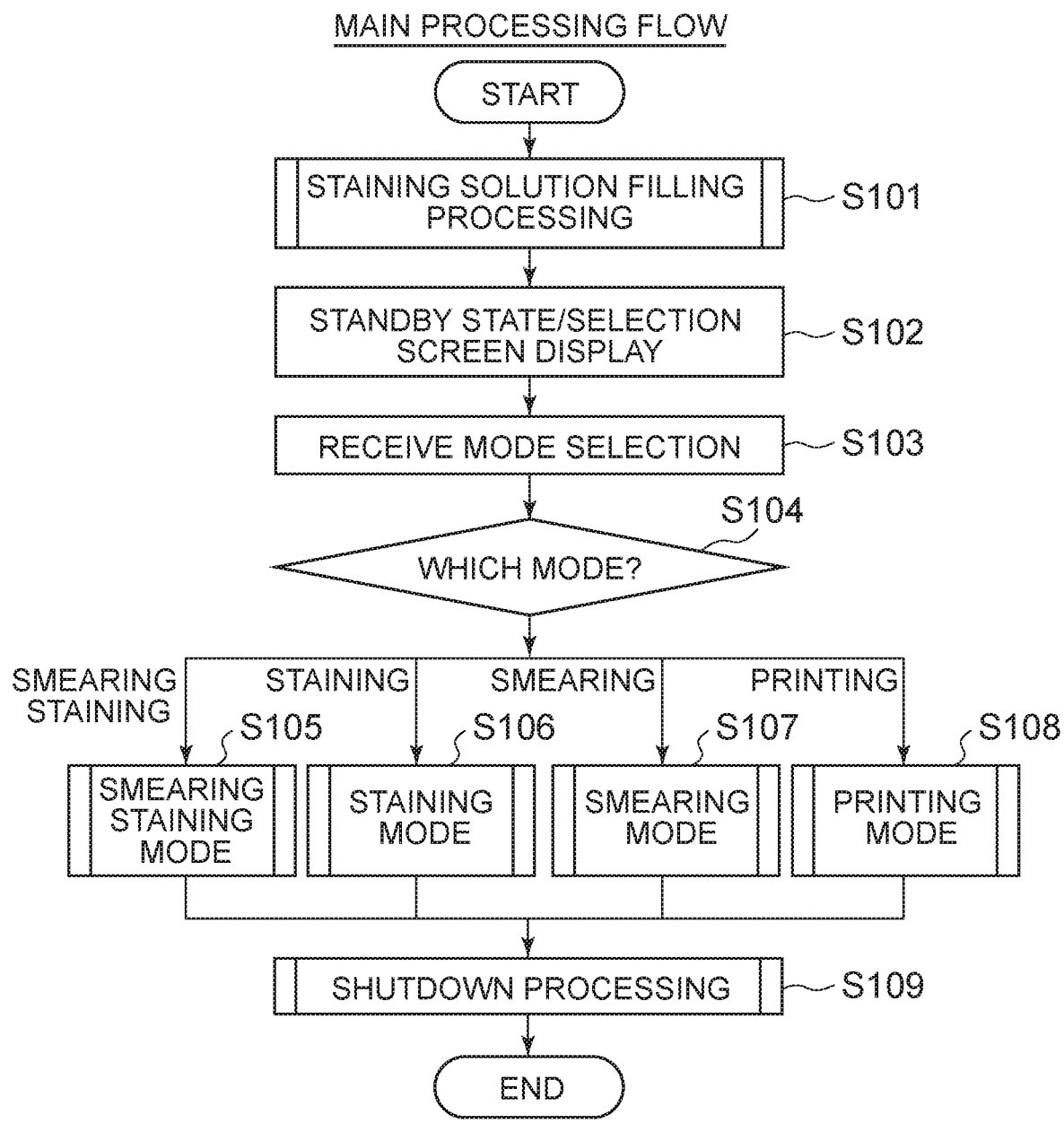
FIG. 15 is a diagram illustrating a main processing flow in operations of a smear preparing apparatus.

In step S103 of FIG. 15, the controller 50 receives a mode selection manipulation made by the user in the aforementioned mode selection screen 330.

In step S104, the controller 50 determines which one of the operation modes is the selected operation mode. When the user selects the smearing staining mode, the controller 50 causes the processing to proceed to step S105 and starts operation control in the smearing staining mode. When the user selects the staining mode, the controller 50 causes the processing to proceed to step S106 and starts operation control in the staining mode. When the user selects the smearing mode, the controller 50 causes the processing to proceed to step S107 and starts operation control in the smearing mode. When the user selects the printing mode, the controller 50 causes the processing to proceed to step S108 and starts operation control in the printing mode.

When the user presses the shutdown button 303 after completion of execution of the operation in the selected mode, the controller 50 performs the shutdown processing in step S109 and terminates the processing.

<Staining Solution Filling Processing>

The staining solution filling processing illustrated in step S101 of FIG. 15 is described with reference to FIG. 17.

In step S111, the controller 50 obtains the setting value of the staining time stored in the memory 55. The setting value of the staining time is set based on the manipulation by the user in the staining condition editing screen 310 illustrated in FIG. 10 and is stored in the memory 55. For example, when the double staining is performed, the controller 50 obtains the setting value of the staining time item 311d (diluted second staining solution) which is the staining time in the second staining processing.

In step S112, the controller 50 determines whether the obtained setting value of the staining time in the second staining solution 15b is equal to or less than the threshold set in advance (see FIG. 11).

Specifically, when the setting value of the staining time in the second staining processing is equal to or less than the threshold, the controller 50 causes the processing to proceed to step S113 and determines the staining tank 21d out of the staining tanks 21d and 21e in which staining is performed by using the second staining solution 15b, as the staining tank used for the staining processing. The controller 50 determines the staining tank 21e as the staining tank not used for the staining processing. When the setting value of the staining time in the second staining processing is greater than the threshold, the controller 50 causes the processing to proceed to step S114 and determines both of the staining tanks 21d and 21e in which staining is performed by using the second staining solution 15b, as the staining tanks used for the staining processing. In this case, no staining tank is set as the staining tank not used for the staining processing.

Note that, in the single staining, the controller 50 determines the staining tank(s) used for the staining processing to be one staining tank of the staining tank 21c, two staining tanks of the staining tanks 21c and 21d, or three staining tanks of the staining tanks 21c to 21e, based on the first threshold and the second threshold illustrated in FIG. 12.

In step S115, the controller 50 controls the fluid circuit unit 40 such that the fluid circuit unit 40 supplies a predetermined amount of the staining solution 15 to the staining tank(s) used for the staining processing. Moreover, the controller 50 controls the fluid circuit unit 40 such that the fluid circuit unit 40 does not supply the staining solution 15 to the staining tank(s) not used for the staining processing. When the processing has proceeded via step S113, the controller 50 controls the fluid circuit unit 40 such that the fluid circuit unit 40 supplies the staining solutions 15 for the staining tanks 21*a* to 21*d* to the staining tanks 21*a* to 21*d* and does not supply the staining solution 15 to the staining tank 21*e*. When the processing has proceeded via step S114, the controller 50 controls the fluid circuit unit 40 such that the fluid circuit unit 40 supplies the staining solutions 15 for the staining tanks 21*a* to 21*e* to the staining tanks 21*a* to 21*e*. The same diluted staining solution of the second staining solution 15*b* is supplied to the staining tanks 21*d* and 21*e*. Moreover, the controller 50 controls the fluid circuit unit 40 such that the fluid circuit unit 40 supplies the cleaning liquids 16 for the cleaning tanks 25*a* and 25*b* to the cleaning tanks 25*a* and 25*b*.

The staining solution filling processing is thereby completed and the smear preparing apparatus 100 switches to a standby state. The controller 50 causes the processing to proceed to step S102 in FIG. 15.

Note that, in the standby state, the setting values of the staining times in the staining condition editing screen 310 can be changed at any timing in the staining condition editing screen 310. When the setting value of any of the staining times is changed, the controller 50 performs the staining solution filling processing and determines the staining tank(s) used for the staining processing. For example, assume a case where the setting value of the staining time in the second staining solution 15*b* is equal to or less than the threshold before changing of the setting value of the staining time and is greater than the threshold after the changing of the setting value of the staining time. In this case, the controller 50 determines the staining tank 21*e* as the staining tank used for the staining processing and controls the fluid circuit unit 40 such that the fluid circuit unit 40 supplies a predetermined amount of the second staining solution 15*b* to the staining tank 21*e*.

<Smearing Staining Mode>

The smearing staining mode illustrated in step S105 of FIG. 15 is described with reference to FIG. 18.

When the smearing staining mode starts, the user can give an instruction of starting operations in the smearing staining mode to the smear preparing apparatus 100 by pressing a not-illustrated start button provided at a predetermined position of the smear preparing apparatus 100. The user sets the sample rack 242 housing the sample containers 241 in the sample conveyor 240 and presses the start button to give the start instruction of the smearing staining mode. The controller 50 receives the start instruction of the smearing staining mode and starts the operations in the smearing staining mode. Note that the reception of operation start instruction is the same in the operation modes other than the smearing staining mode such as the staining mode, the printing mode, and the smearing mode.

In step S131, the controller 50 controls the sample conveyor 240 and the aspirator 250 such that the aspirator 250 aspirates the sample from each of the sample containers 241 set in the sample conveyor 240 by the user.

The controller 50 controls the sample conveyor 240 such that one of the sample containers 241 held in the sample rack 242 on the sample conveyor 240 is arranged at the take-in position. The controller 50 controls the aspirator 250 such that the aspirator 250 aspirates the sample in the sample container 241 conveyed to the take-in position. The sample aspirated by the aspirator 250 is sent to the smearing unit 140.

The controller 50 executes processing of steps S132 to S135 in parallel with step S131. In step S132, the controller 50 controls the slide supplier 110 such that the slide supplier 110 sends out the unused glass slide 10 onto the first slide conveyor 210. Then the controller 50 controls the first slide conveyor 210 holding the glass slide 10 such that the first slide conveyor 210 moves to the attached matter remover 120.

In step S133, the controller 50 operates the attached matter remover 120 and causes it to remove attached matters on the surface of the glass slide 10. In step S134, the controller 50 controls the first slide conveyor 210 holding the glass slide 10 such that the first slide conveyor 210 moves to the printer 130. In step S135, the controller 50 controls the printer 130 such that the printer 130 executes the printing processing of printing the sample information in the print region 12 of the glass slide 10.

Next, in step S136, the controller 50 controls the first slide conveyor 210 holding the glass slide 10 such that the first slide conveyor 210 moves to the smearing unit 140. In step S137, the controller 50 controls the smearing unit 140 such that the smearing unit 140 executes the smearing processing of smearing the sample in the smear region 11 of the glass slide 10.

Next, in step S138, the controller 50 controls the unloading mechanism 220 such that the unloading mechanism 220 conveys the glass slide 10 subjected to the printing and the smearing from the smearing unit 140 to the first dryer 150. In step S139, the controller 50 controls the first dryer 150 such that the first dryer 150 executes the processing of drying the sample by blowing air to the smear region 11 of the glass slide 10.

Next, in step S40, the controller 50 performs control of conveying the glass slide 10 subjected to the printing processing, the smearing processing, and the drying processing to the staining unit 20. Specifically, the controller 50 controls the unloading mechanism 220 such that the unloading mechanism 220 hands over the glass slide 10 subjected to the drying processing from the first dryer 150 to the second slide conveyor 230. The controller 50 controls the second slide conveyor 230 such that the second slide conveyor 230 conveys the glass slide 10 to the take-out position 410. When the glass slide 10 reaches the take-out position 410, the controller 50 controls the first transfer unit 30*a* of the transfer unit 30 such that the first transfer unit 30*a* grips the glass slide 10 at the take-out position 410 and takes the glass slide 10 out of the second slide conveyor 230 to transfer the glass slide 10 to the staining unit 20. The glass slide 10 is thereby transferred to the staining unit 20.

In step S141, the controller 50 controls the transfer unit 30 and the fluid circuit unit 40 such that the staining unit 20 executes the staining processing. Details of a staining processing operation are described later.

In step S142, the controller 50 controls the second transfer unit 30*b* of the transfer unit 30 such that the second transfer unit 30*b* transfers the glass slide 10 subjected to the staining processing, from the staining unit 20 to the second dryer 170. In step S143, the controller 50 controls the second dryer 170 such that the second dryer 170 executes the processing of drying the glass slide 10 by blowing air to the glass slide 10.

In step S144, the controller 50 controls the second transfer unit 30*b* and the slide housing unit 180 such that the dried glass slide 10 is transferred from the second dryer 170 to the slide housing unit 180. The controller 50 controls the slide housing unit 180 such that the slide housing unit 180 moves the slide housing container 190 to the setting position 411. The controller 50 controls the second transfer unit 30*b* such that the second transfer unit 30*b* takes the glass slide 10 out of the second dryer 170 and sets the glass slide 10 in the slide housing container 190 at the setting position 411.

The printing processing, the smearing processing, and the staining processing are thereby sequentially performed on the unused glass slide 10 and the prepared smear (glass slide 10 subjected to processing) is housed in the slide housing container 190 set in the slide housing unit 180.

The controller 50 controls the sample conveyor 240 and the aspirator 250 such that the sample conveyor 240 conveys the sample racks 242 one by one and the aspirator 250 takes the sample containers 241 one by one out of each sample rack 242 to aspirate the samples from the sample containers 241. Moreover, the controller 50 repeats the aforementioned processing of the smearing staining mode such that the printing processing, the smearing processing, and the staining processing are sequentially executed on the unused glass slide 10 by using each of the samples aspirated one by one. Accordingly, the staining processing in the staining unit 20 is performed one by one on the glass slides 10 transferred by the transfer unit 30, at predetermined time intervals depending on an operation cycle of the smear preparing apparatus 100.

<Staining Processing>

Next, details of the staining processing in step S141 of FIG. 18 are described with reference to FIG. 19. FIG. 10 is referred to for the setting values of the staining times.

In step S151, the controller 50 performs control of executing staining processing using the staining tank 21*a*. The controller 50 controls the first transfer unit 30*a* such that the first transfer unit 30*a* transfers the held glass slide 10 into one of the insertion regions 23 of the staining tank 21*a*. Methanol is accommodated in the staining tank 21*a* as the staining solution 15. The controller 50 controls the transfer unit 30 such that the glass slide 10 is immersed in the staining solution 15 in the staining tank 21*a* for the staining time (setting value of the staining time item 311*a*) stored in the memory 55.

In step S152, the controller 50 performs control of executing staining processing using the staining tank 21*b*. The controller 50 controls the first transfer unit 30*a* such that the first transfer unit 30*a* takes the glass slide 10 for which the staining time has elapsed, out of the inside of the staining tank 21*a*. The controller 50 controls the first transfer unit 30*a* of the transfer unit 30 such that the first transfer unit 30*a* transfers the held glass slide 10 into one of the insertion regions 23 of the staining tank 21*b*. The undiluted first staining solution 15*a* is accommodated in the staining tank 21*b* as the staining solution 15. The controller 50 controls the transfer unit 30 such that the glass slide 10 is immersed in the staining solution 15 in the staining tank 21*b* for the staining time (setting value of the staining time item 311*b*) stored in the memory 55.

In step S153, the controller 50 performs control of executing staining processing using the staining tank 21*c*. The controller 50 controls the first transfer unit 30*a* such that the first transfer unit 30*a* takes the glass slide 10 for which the staining time has elapsed, out of the inside of the staining tank 21*b*. The controller 50 controls the first transfer unit 30*a* of the transfer unit 30 such that the first transfer unit 30*a* transfers the held glass slide 10 into one of the insertion regions 23 of the staining tank 21*c*. The diluted staining solution of the first staining solution 15*a* is accommodated in the staining tank 21*c* as the staining solution 15. The controller 50 controls the transfer unit 30 such that the glass slide 10 is immersed in the staining solution 15 in the staining tank 21*c* for the staining time (setting value of the staining time item 311*c*) stored in the memory 55.

In step S154, the controller 50 performs control of executing cleaning processing using the cleaning tank 25*a*. The controller 50 controls the first transfer unit 30*a* of the such that the first transfer unit 30*a* takes the glass slide 10 for which the staining time has elapsed, out of the inside of the staining tank 21*c*. The controller 50 controls the first transfer unit 30*a* of the transfer unit 30 such that the first transfer unit 30*a* transfers the held glass slide 10 into the insertion region 26 of the cleaning tank 25*a*. The buffer solution is accommodated in the cleaning tank 25*a* as the cleaning liquid 16. The controller 50 controls the transfer unit 30 such that the glass slide 10 is immersed in the cleaning liquid 16 in the cleaning tank 25*a* for the cleaning time stored in the memory 55. The controller 50 controls the fluid circuit unit 40 such that the fluid circuit unit 40 discharges the cleaning liquid 16 from the cleaning tank 25*a* to the waste liquid chamber 45 after lapse of the cleaning time.

In step S155, the controller 50 obtains the staining tank(s) used for the staining processing in the staining tanks 21*d* and 21*e* in which the staining processing is performed by using the second staining solution 15*b*. When the staining tank 21*d* alone is the staining tank used for the staining processing (that is, when the staining tank 21*e* is the staining tank not used for the staining processing), the controller 50 causes the processing to proceed to step S156 and executes the staining processing using the staining tank 21*d*. When the staining tanks 21*d* and 21*e* are both the staining tanks used for the staining processing, the controller 50 causes the processing to proceed to step S157 and executes the staining processing in both of the staining tanks 21*d* and 21*e*.

In step S156, the controller 50 performs control of executing staining processing using the staining tank 21*d*. The controller 50 controls the second transfer unit 30*b* such that the second transfer unit 30*b* takes the glass slide 10 for which the cleaning time has elapsed, out of the inside of the cleaning tank 25*a*. The controller 50 controls the second transfer unit 30*b* of the transfer unit 30 such that the second transfer unit 30*b* transfers the held glass slide 10 into one of the insertion regions 23 of the staining tank 21*d* used for the staining processing. The diluted staining solution of the second staining solution 15*b* is accommodated in the staining tank 21*d*. The controller 50 controls the transfer unit 30 such that the glass slide 10 is immersed in the staining solution 15 in the staining tank 21*d* for the staining time (setting value of the staining time item 311*d*) stored in the memory 55.

In step S157, the controller 50 performs control of executing the staining processing in both of the staining tanks 21*d* and 21*e*. The glass slide 10 taken out of the inside of the cleaning tank 25*a* is transferred to one of the staining tanks 21*d* and 21*e* and subjected to the staining processing. When the glass slides 10 are set in all of the insertion regions 23 of the staining tank 21*d*, the controller 50 sets the glass slides 10 in the insertion regions 23 of the staining tank 21*e*. The staining processing using the second staining solution 15*b* is performed on the different glass slides 10 in the staining tanks 21*d* and 21*e* in parallel.

In step S158, the controller 50 performs control of executing cleaning processing using the cleaning tank 25*b*. The controller 50 controls the second transfer unit 30*b* such that the second transfer unit 30*b* takes the glass slide 10 for which the staining time has elapsed, out of the inside of the staining tank 21d or 21e. The controller 50 controls the second transfer unit 30b of the transfer unit 30 such that the second transfer unit 30b transfers the held glass slide 10 into the insertion region 26 of the cleaning tank 25b. Pure water is accommodated in the cleaning tank 25b as the cleaning liquid 16. The controller 50 controls the transfer unit 30 such that the glass slide 10 is immersed in the cleaning liquid 16 in the cleaning tank 25b for the cleaning time stored in the memory 55. The controller 50 controls the second transfer unit 30b such that the second transfer unit 30b takes the glass slide 10 out of the cleaning tank 25b after lapse of the cleaning time. The controller 50 controls the fluid circuit unit 40 such that the fluid circuit unit 40 discharges the cleaning liquid 16 from the cleaning tank 25b to the waste liquid chamber 45. The staining processing on the glass slide 10 is thereby completed.

In the single staining, the processing of step S155 is performed before step S153 and the processing proceeds to one of three branches depending on whether the staining tank(s) used for the staining processing is (are) one staining tank of the staining tank 21c, two staining tanks of the staining tanks 21c and 21d, or three staining tanks of the staining tanks 21c to 21e. Since the cleaning tank 25a is not used, step S154 is skipped.

<Processing of Determining Setting Positions of Glass Slides in Staining Tanks>

Processing of determining the setting positions of the glass slides 10 in the staining tanks 21 is described with reference to FIGS. 20 to 22. Particularly, specific description is given of the case where the staining processing using the staining tank 21d is executed in step S156 and the case where the staining processing is executed in both of the staining tanks 21d and 21e in step S157.

Figure 20:
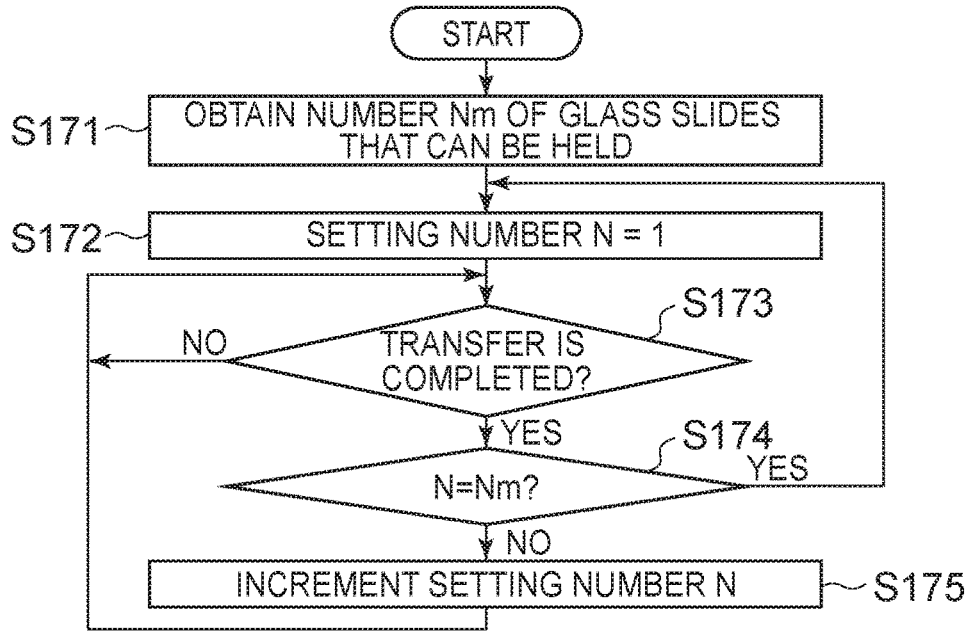
FIG. 20 is a flow diagram illustrating processing of determining setting positions of glass slides.

In step S171 of FIG. 20, the controller 50 obtains the number Nm of glass slides 10 that can be held by the staining tank(s) 21 determined to be used for the staining processing. In the example illustrated in FIG. 5, the staining tanks 21d and 21e each have ten insertion regions 23 and ten glass slides 10 can be set therein.

Accordingly, in step S156, when the staining tank 21d is the staining tank used for the staining processing and the staining tank 21e is the staining tank not used for the staining processing, the controller 50 sets the number Nm of glass slides 10 that can be held to 10 (Nm=10). Moreover, in step S157, when both of the staining tank 21d and 21e are the staining tanks used for the staining processing, the controller 50 sets the number Nm of glass slides 10 that can be held to 20 (Nm=20).

Figure 21:
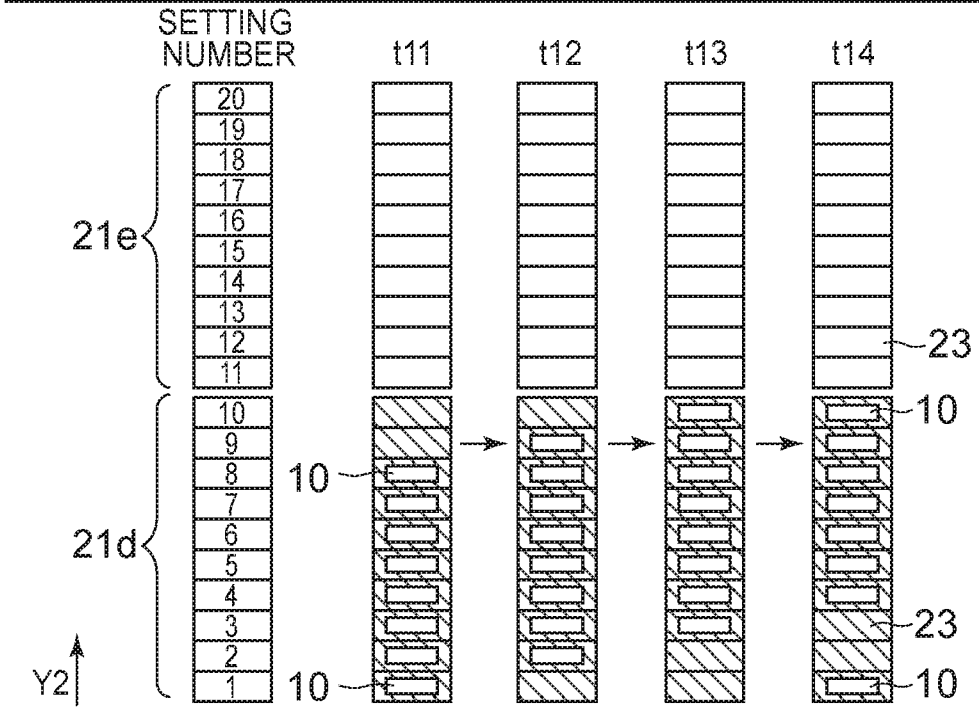
FIG. 21 is a schematic diagram illustrating changes in setting positions in a case where there is a staining tank not used for staining processing.
Figure 22:
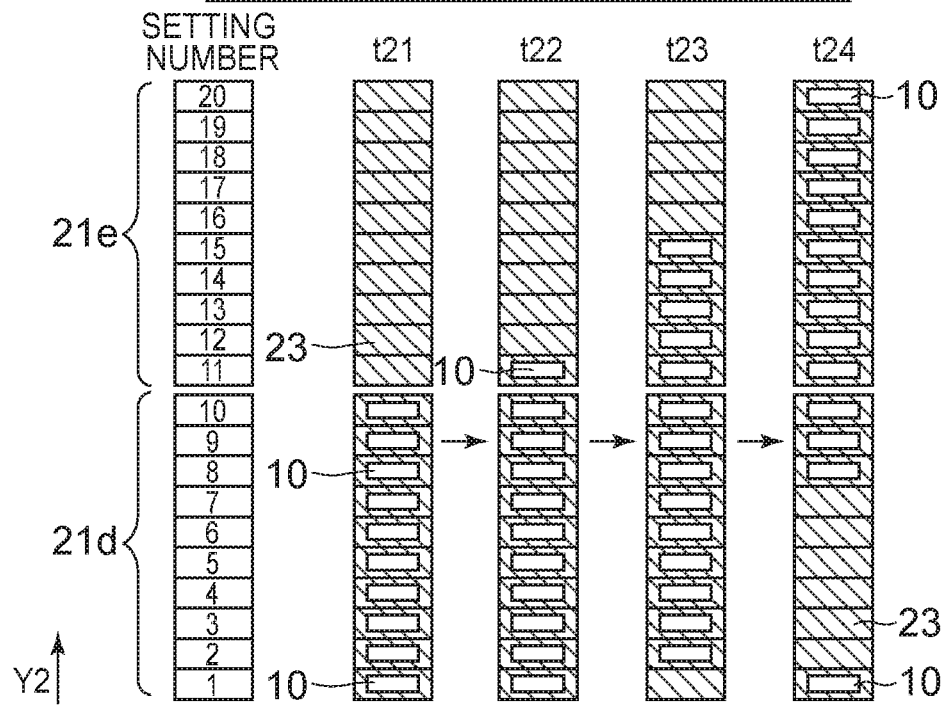
FIG. 22 is a schematic diagram illustrating changes in setting positions in a case where there is no staining tank not used for staining processing.

Next, as illustrated in FIGS. 21 and 22, the controller 50 determines the setting position of one glass slide 10 to be transferred in a current operation. In this case, setting numbers of 1 to 10 are assigned respectively to the insertion regions 23 in the staining tanks 21d in the order from the Y1 direction side toward the Y2 direction side, for the sake of convenience. Setting numbers 11 to 20 are assigned respectively to the insertion regions 23 in the staining tank 21e in the order from the Y1 direction side toward the Y2 direction side.

The controller 50 controls the transfer unit 30 such that the transfer unit 30 sets the glass slides 10 in the insertion regions 23 in the ascending order of the setting numbers. Specifically, in step S172, the controller 50 sets the setting number N=1 for the first glass slide 10 to be subjected to the staining processing. More specifically, the controller 50 assigns the insertion region 23 with the setting number 1 in the staining tank 21d as the setting position of the first glass slide 10.

Figure 19:
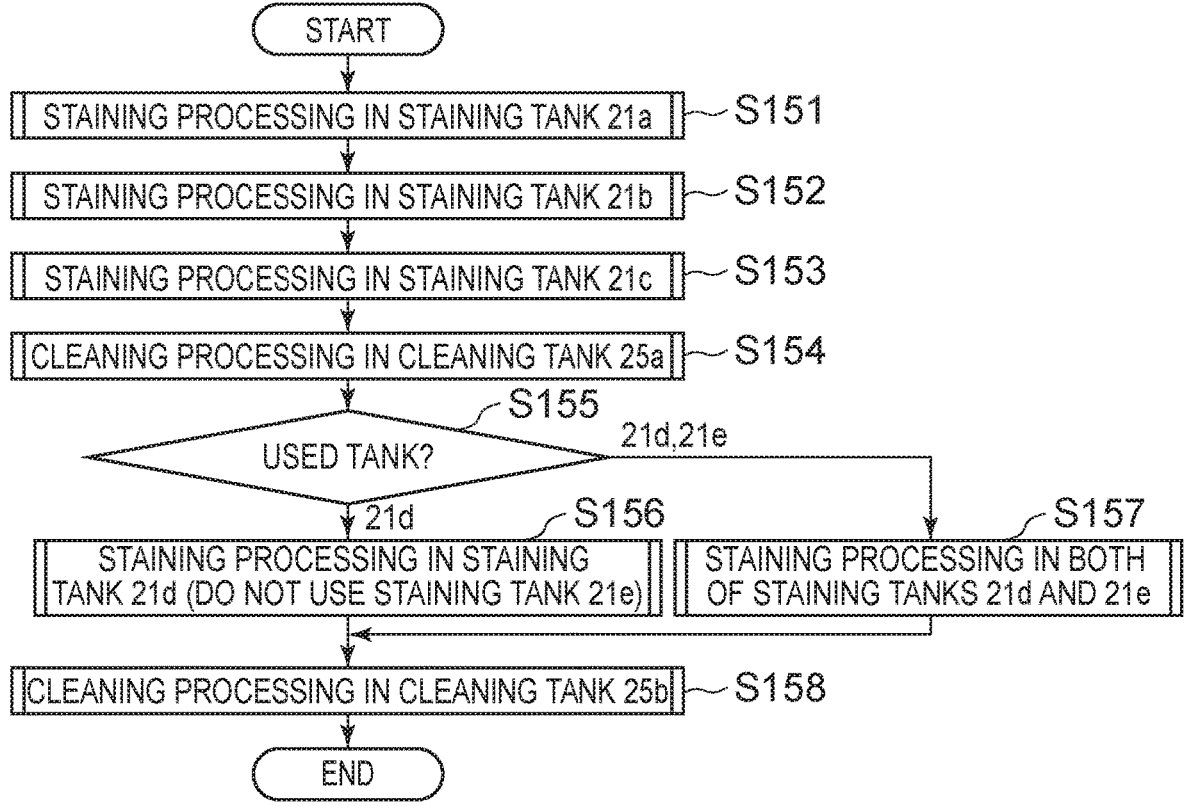
FIG. 19 is a flow diagram illustrating staining processing.

As a result, in step S156 or S157 of FIG. 19, the first glass slide 10 is transferred to the insertion region 23 with the setting number 1. In step S173, the controller 50 determines whether the transfer of the first glass slide 10 is completed. The controller 50 repeats step S173 until the transfer of the glass slide 10 is completed. When the transfer of the glass slides 10 is completed, in step S174, the controller 50 determines whether the setting number N of the current operation is equal to Nm. When N is not equal to Nm, in step S175, the controller 50 increments the setting number N. Specifically, the controller 50 sets the setting number N for the glass slide 10 to be transferred in the next operation to N+1.

The controller 50 repeats the processing of steps S173 to S175 every time one glass slide 10 is set in the staining tank 21d or the staining tank 21e. When the processing of steps S173 to S175 is repeated and the setting number N of the current operation reaches the number Nm of glass slides 10 that can be held, in step S174, the controller 50 determines that the setting number N of the current operation is equal to Nm and causes the processing to return to step S172. The controller 50 thereby sets the setting number N for the glass slide 10 to be transferred in the next operation to 1.

The setting positions of the glass slides 10 in the staining tanks 21 are determined as a result of the aforementioned processing.

FIG. 21 illustrates a setting example of the glass slides 10 in the case of step S156 and FIG. 22 illustrates a setting example of the glass slides 10 in the case of step S157.

<Staining Processing Using Staining Tank 21d>

As illustrated in FIG. 21, in the case of step S156 in which the staining tank 21d is the staining tank used for the staining processing and the staining tank 21e is the staining tank not used for the staining processing, Nm is 10 and the staining tank 21e is not used for the staining processing and is not supplied with staining solution 15. The insertion regions 23 supplied with the staining solution 15 are illustrated by being hatched. The insertion regions 23 not supplied with the staining solution 15 are illustrated without hatching.

FIG. 21 illustrates an example in which the staining time C is set within a range of 8A<C<9A with respect to the transfer time interval A of the glass slides 10. In the case of step S156, the glass slides 10 are set in order from N=1 and, at timing t11, the eighth glass slide 10 is set in the insertion region 23 with the setting number N=8. Since the staining time C for the first glass slide 10 elapses before timing t12 at which the ninth glass slide 10 is set, the glass slide 10 in the insertion region 23 with the setting number N=1 is taken out and subjected to processing of step S158 and beyond. Then, at timing t12, the ninth glass slide 10 is set in the insertion region 23 with the setting number N=9. At timing t13, the tenth glass slide 10 is set in the insertion region 23 with the setting number N=10. In this case, the setting number N of the current operation becomes equal to Nm. Accordingly, the controller 50 sets the setting position of the subsequent eleventh glass slide 10 to the setting number N=1. At timing t14, the eleventh glass slide 10 is set in the insertion region 23 with the setting number N=1. As described above, in the case of step S156, the glass slides 10 transferred at the transfer time interval A are subjected to the processing only in the staining tank 21d out of the staining tanks 21d and 21e.

<Staining Processing Using Staining Tanks 21d and 21e>

As illustrated in FIG. 22, in the case of step S157 in which both of the staining tanks 21d and 21e are the staining tanks used for the staining processing, Nm is 20 and both of the staining tanks 21*d* and 21*e* are supplied with the staining solution 15.

FIG. 22 illustrates an example in which the staining time C is set within a range of 14A<C<15A with respect to the transfer time interval A of the glass slides 10. In the case of step S157, the glass slides 10 are set in order from N=1 and, at timing t21, the tenth glass slide 10 is set in the insertion region 23 with the setting number N=10 in the staining tank 21*d*. Then, at timing t22, the eleventh glass slide 10 is set in the insertion region 23 with the setting number N=11 in the staining tank 21*e*.

Since the staining time for the first glass slide 10 elapses before timing t23 at which the fifteenth glass slide 10 is set, the glass slide 10 in the insertion region 23 with the setting number N=1 is taken out and subjected to processing of step S158 and beyond. Then, at timing t23, the fifteenth glass slide 10 is set in the insertion region 23 with the setting number N=15 in the staining tank 21*e*.

At timing t24, the twentieth glass slide 10 is set in the insertion region 23 with the setting number N=20 in the staining tank 21*e*. In this case, the setting number N of the current operation becomes equal to Nm. Accordingly, the controller 50 sets the setting position of the subsequent twenty-first glass slide 10 to the setting number N=1. Although illustration is omitted, the twenty-first glass slide 10 is set in the insertion region 23 with the setting number N=1 in the staining tank 21*d*. As described above, in the case of step S157, the glass slides 10 transferred at the transfer time interval A are subjected to the processing in the staining tanks 21*d* and 21*e* in parallel.

In the case of the single staining, the number Nm of the glass slides 10 that can be held is set for each of the case where the staining tank used for the staining processing is one staining tank of the staining tank 21*c*, the case where the staining tanks used for the staining processing are two staining tanks of the staining tanks 21*c* and 21*d*, and the case where the staining tanks used for the staining processing are three staining tanks of the staining tanks 21*c* to 21*e*. The setting number N=1 is assigned to the first insertion region 23 in the staining tank 21*c*. The other processing in the processing of determining the setting positions is similar to that in the double staining.

<Staining Mode>

Figure 23:
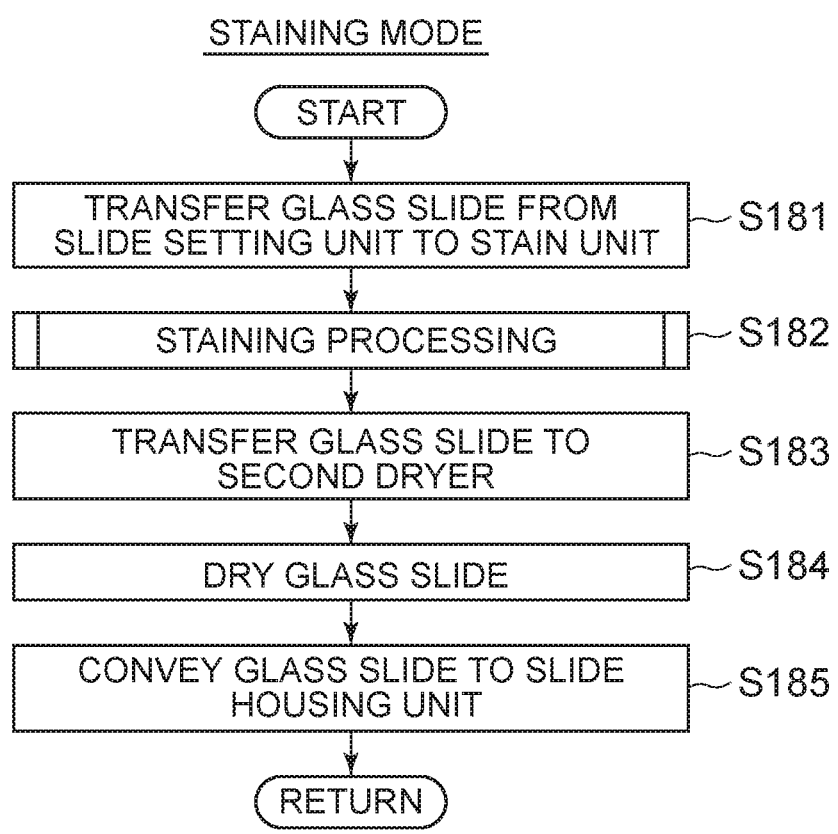
FIG. 23 is a flow diagram illustrating operations in a staining mode.

The staining mode illustrated in step S106 of FIG. 15 is described with reference to FIG. 23.

In the staining mode, the user sets the slide housing container 190 housing the glass slides 10 subjected to smearing into the slide setting unit 160 and inputs an instruction of starting operations in the staining mode. When the staining mode starts, in step S181, the controller 50 controls the first transfer unit 30*a* such that the first transfer unit 30*a* takes the glass slides 10 to be conveyed one by one out of the slide housing container 190 in the slide setting unit 160 and transfers the glass slide 10 to the staining unit 20.

Next, the controller 50 controls the first transfer unit 30*a* and the fluid circuit unit 40 such that the staining processing is performed on the glass slide 10 transferred by the first transfer unit 30*a* in the staining unit 20. The controller 50 controls the transfer unit 30 such that the transfer unit 30 transfers the glass slides 10 one by one into the staining unit 20 at the predetermined transfer time interval A. Since the contents of the staining processing are similar to those in FIG. 19, description thereof is omitted.

When the staining processing is completed, in step S183, the controller 50 controls the second transfer unit 30*b* such that the second transfer unit 30*b* transfers the glass slides 10 subjected to the staining processing, from the cleaning tank 25*b* of the staining unit 20 to the second dryer 170 one by one. In step S184, the controller 50 controls the second dryer 170 such that the second dryer 170 blows air to the glass slide 10 set in the second dryer 170, and dries the glass slide 10. When the drying by the second dryer 170 is completed, in step S185, the controller 50 controls the second transfer unit 30*b* and the slide housing unit 180 such that the dried glass slide 10 is transferred to the slide housing unit 180. Steps S182 to S185 are similar to steps S141 to S144 described above.

<Smearing Mode>

The smearing mode illustrated in step S107 of FIG. 15 is described with reference to FIG. 24.

Figure 24:
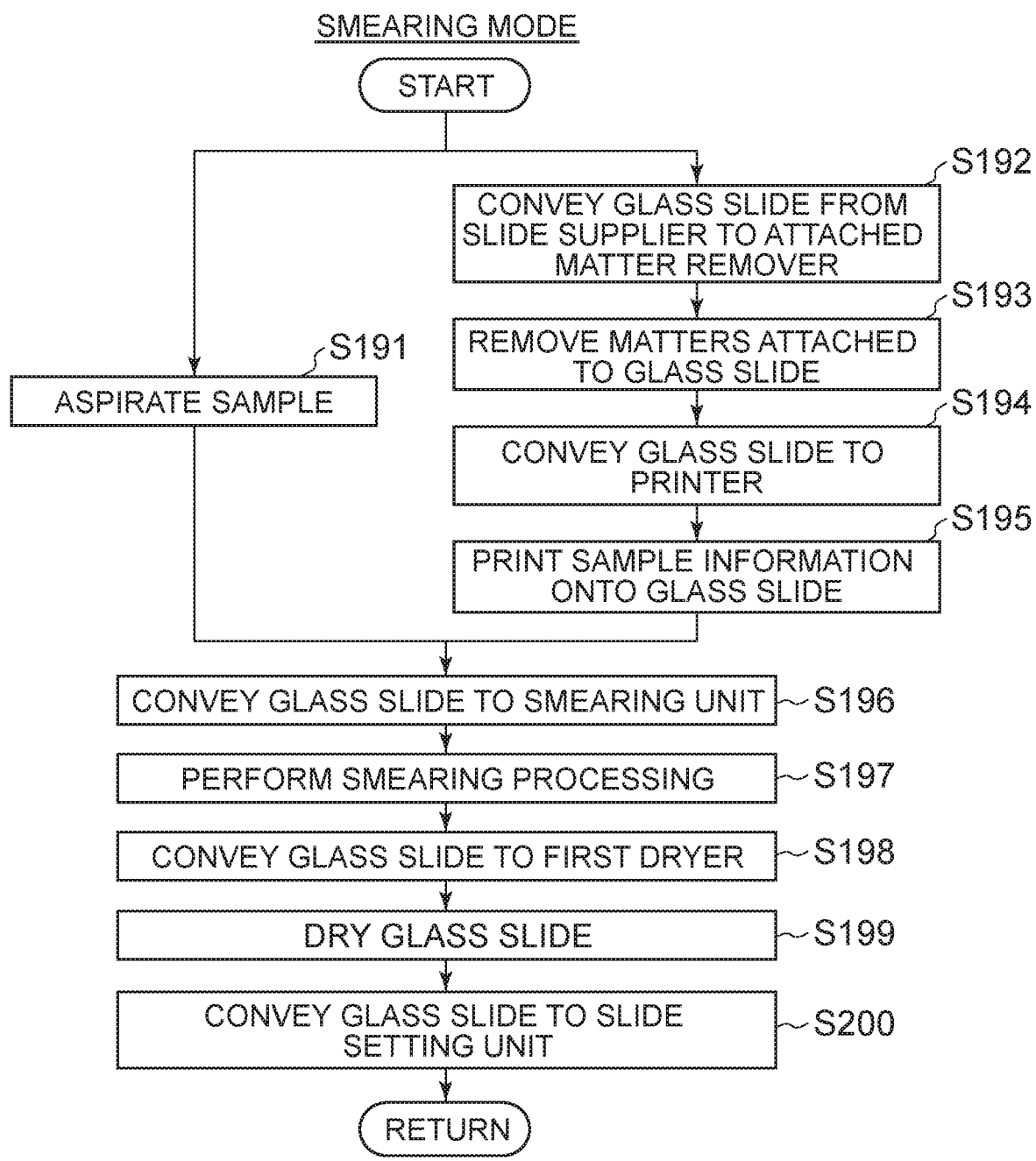
FIG. 24 is a flow diagram illustrating operations in a smearing mode.

As illustrated in FIG. 24, steps S191 to S199 in the smearing mode are similar to steps S131 to S139 in the smearing staining mode illustrated in FIG. 18. The smearing mode is different from the smearing staining mode in step S200.

In the smearing mode, in step S191, the controller 50 performs control of causing the sample conveyor 240 and the aspirator 250 to perform the operation of aspirating the sample.

In step S192, the controller 50 performs control such that the slide supplier 110 sends out the unused glass slide 10 onto the first slide conveyor 210 and the first slide conveyor 210 moves to the attached matter remover 120.

In step S193, the controller 50 causes the attached matter remover 120 to remove attached matters on the surface of the glass slide 10. In step S194, the controller 50 causes the first slide conveyor 210 holding the glass slide 10 to move to the printer 130. In step S135, the controller 50 causes the printer 130 to execute the printing processing.

Next, in step S196, the controller 50 causes the first slide conveyor 210 holding the glass slide 10 to move to the smearing unit 140. In step S197, the controller 50 causes the smearing unit 140 to execute the smearing processing.

Next, in step S198, the controller 50 causes the unloading mechanism 220 to convey the glass slide 10 subjected to printing and smearing to the first dryer 150. In step S139, the controller 50 causes the first dryer 150 to execute processing of drying the sample on the glass slide 10.

In step S200, the controller 50 performs control of transferring the glass slide 10, subjected to the drying processing by the first dryer 150, from the first dryer 150 into the slide housing container 190 set in the slide setting unit 160. First, the controller 50 controls the unloading mechanism 220 such that the unloading mechanism 220 hands over the glass slide 10 subjected to the drying processing from the first dryer 150 to the second slide conveyor 230. The controller 50 controls the second slide conveyor 230 such that the second slide conveyor 230 conveys the glass slide 10 in the X1 direction to the take-out position 410. When the glass slide 10 reaches the take-out position 410, the controller 50 controls the first transfer unit 30*a* of the transfer unit 30 such that the first transfer unit 30*a* grips the glass slide 10 at the take-out position 410 and takes the glass slide 10 out of the second slide conveyor 230 to transfer the glass slide 10 into the slide housing container 190 set in the slide setting unit 160. The glass slide 10 is thereby transferred to the slide setting unit 160. The smearing mode is thus completed.

The glass slide 10 subjected to the smear processing and not subjected to the staining processing can be thus conveyed to the slide setting unit 160 without being conveyed to the staining unit 20. The user can promptly take the glass slide 10 subjected to smearing, out of the apparatus.

(Printing Mode) The printing mode illustrated in step S108 of FIG. 15 is described with reference to FIG. 25.

Figure 25:
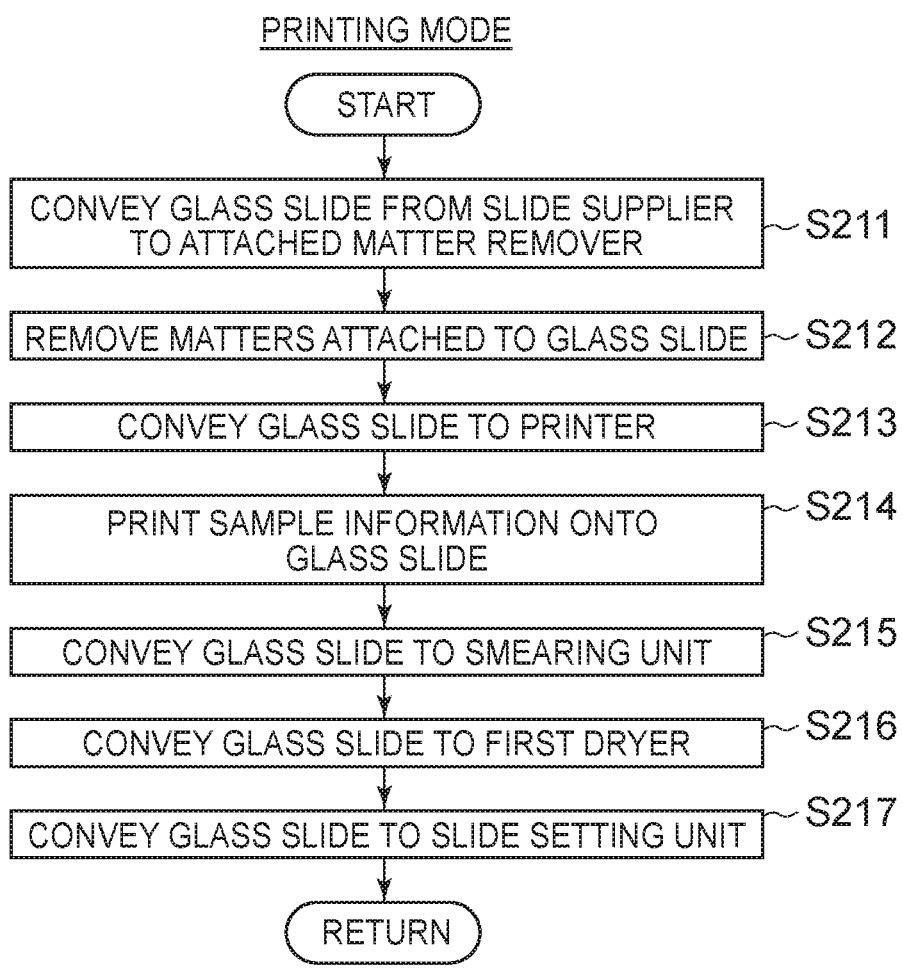
FIG. 25 is a flow diagram illustrating operations in a printing mode.

As illustrated in FIG. 25, steps S211 to S216 in the printing mode are similar to steps S132 to S139 in the smearing staining mode illustrated in FIG. 18. In the printing mode, in step S217, the glass slide 10 subjected to the printing processing is transferred to the slide setting unit 160 instead of the staining unit 20.

When the printing mode starts, in step S211, the controller 50 performs control such that the slide supplier 110 sends out the unused glass slide 10 to the first slide conveyor 210 and the first slide conveyor 210 moves to the attached matter remover 120.

In step S212, the controller 50 causes the attached matter remover 120 to remove attached matters on the surface of the glass slide 10. In step S213, the controller 50 causes the first slide conveyor 210 holding the glass slide 10 to move to the printer 130. In step S214, the controller 50 causes the printer 130 to execute the printing processing.

Next, in step S215, the controller 50 causes the first slide conveyor 210 holding the glass slide 10 to move to the smearing unit 140. In the printing mode, the glass slide 10 simply passes through the smearing unit 140 and the first dryer 150 without being subjected to the smearing processing in the smearing unit 140 and the sample drying processing in the first dryer 150. Specifically, in step S216, the controller 50 causes the unloading mechanism 220 to convey the glass slide 10 subjected to printing to the first dryer 150.

In step S217, the controller 50 controls the unloading mechanism 220 such that the unloading mechanism 220 hands over the glass slide 10 from the first dryer 150 to the second slide conveyor 230. The controller 50 controls the second slide conveyor 230 such that the second slide conveyor 230 conveys the glass slide 10 to the take-out position 410. When the glass slide 10 reaches the take-out position 410, the controller 50 controls the first transfer unit 30a of the transfer unit 30 such that the first transfer unit 30a grips the glass slide 10 at the take-out position 410 and takes the glass slide 10 out of the second slide conveyor 230 to transfer the glass slide 10 into the slide housing container 190 set in the slide setting unit 160. The glass slide 10 is thereby transferred to the slide setting unit 160. The printing mode is thus completed.

The glass slide 10 subjected to the printing processing and not subjected to the staining processing and the smearing processing can be thereby conveyed to the slide setting unit 160 without being conveyed to the staining unit 20. The user can promptly take the glass slide 10 subjected to printing, out of the apparatus.

<Shutdown Processing>

Figure 26:
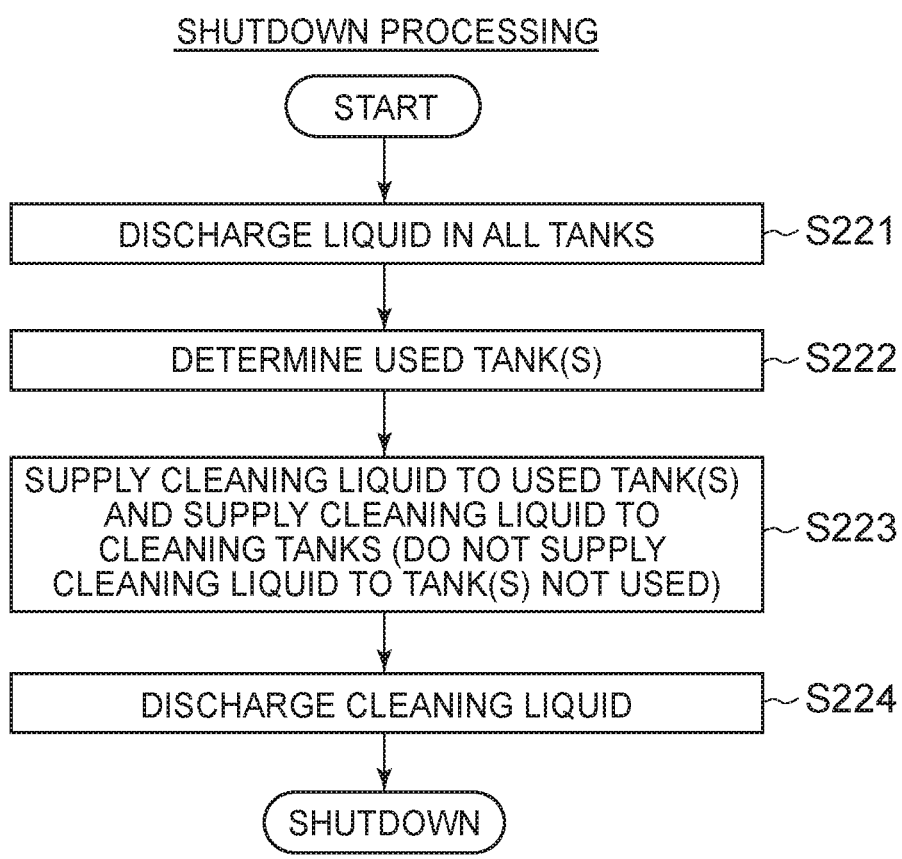
FIG. 26 is a flow diagram illustrating shutdown processing.
Figure 27:
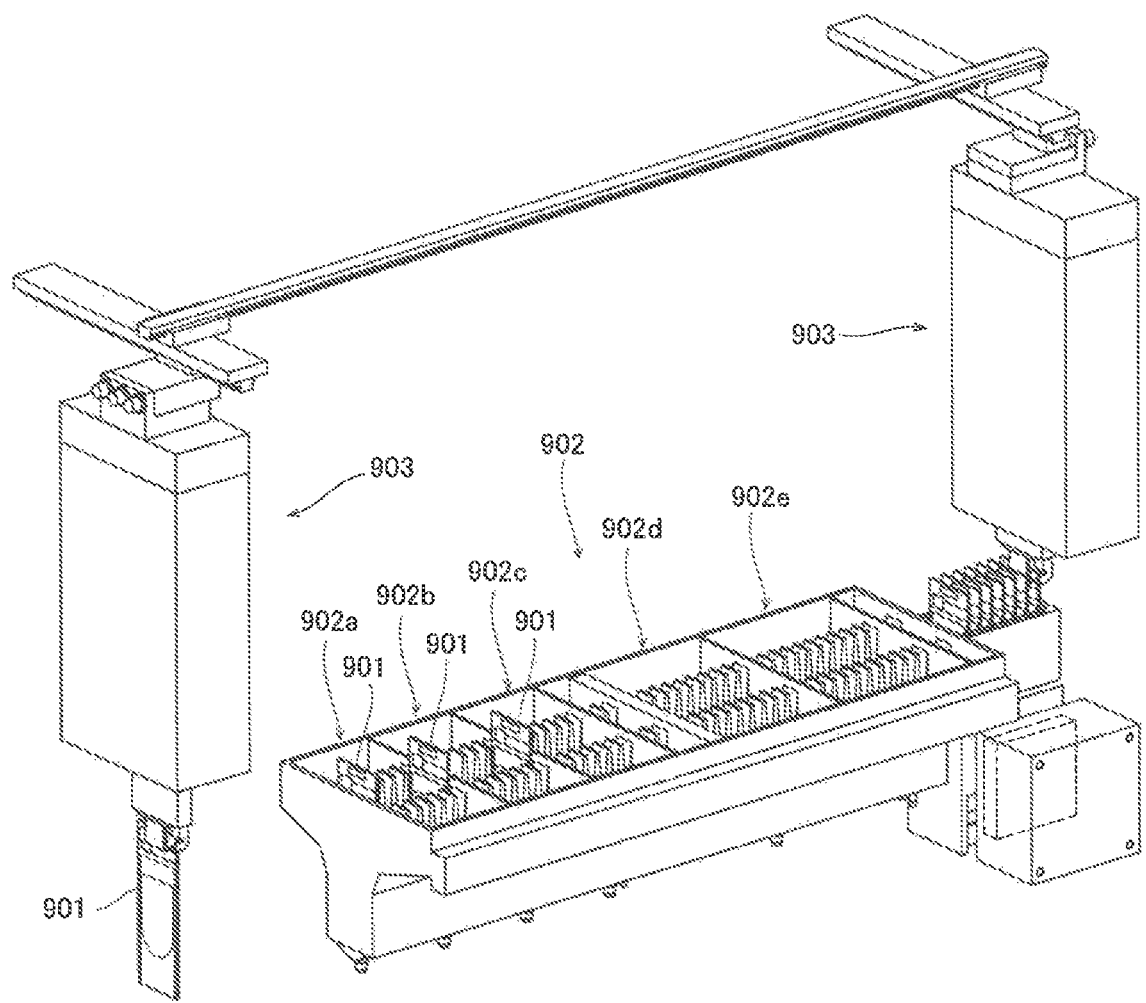
FIG. 27 is a diagram illustrating a conventional technique.

Next, control processing of the cleaning operation in the shutdown processing illustrated in step S109 of FIG. 15 is described with reference to FIG. 26.

In step 221, the controller 50 controls the fluid circuit unit 40 such that the fluid circuit unit 40 discharges the liquids in all tanks of the staining unit 20. The controller 50 causes the fluid circuit unit 40 to open the valves 43 between the waste liquid chamber 45 and the respective staining tanks 21a to 21e and cleaning tanks 25a and 25b to discharge the liquids in the tanks to the waste liquid chamber 45.

In step S221, the controller 50 determines the staining tank(s) used for the staining processing. Specifically, the controller 50 determines the staining tank(s) used for the staining processing and the staining tank(s) not used for the staining processing among the staining tanks 21a to 21e in a period from the activation of the smear preparing apparatus 100 to the execution of the shutdown processing. When the staining time is less than the threshold in step S112 of FIG. 17 (see FIG. 11), the staining tank 21e is the staining tank not used for the staining processing.

In step S222, the controller 50 controls the fluid circuit unit 40 such that the cleaning liquid 18 for tank cleaning is supplied to the staining tank(s) used for the staining processing among the staining tanks 21. Meanwhile, the controller 50 controls the fluid circuit unit 40 such that the amount V4 of the cleaning liquid supplied to the staining tank(s) not used for the staining processing among the staining tanks 21 is smaller than the amount V3 of the cleaning liquid supplied to the staining tank(s) used for the staining processing among the staining tanks 21. In an embodiment, the controller 50 sets the amount V4 of the cleaning liquid supplied to the staining tank(s) not used for the staining processing to zero. In other words, the controller 50 causes no cleaning liquid 18 to be supplied to the staining tank(s) not used for the staining processing.

Thereafter, in step S223, the controller 50 controls the fluid circuit unit 40 such that the fluid circuit unit 40 discharges the supplied cleaning liquid 18 from the tanks of the staining unit 20. The controller 50 causes the fluid circuit unit 40 to open the valves 43 between the waste chamber 45 and the respective staining tanks 21a to 21e and cleaning tanks 25a and 25b to discharge the cleaning liquid 18 in the tanks to the waste liquid chamber 45. The control processing of the cleaning operation in the shutdown processing is thus completed.

Note that an embodiment disclosed herein should be considered as exemplary in all respects and does not limit the present invention. The scope of the present invention is defined not by the description of the aforementioned embodiment but by the scope of claims, and includes all equivalents and all modifications within the scope of claims.

The invention claimed is:

1. A smear preparing apparatus comprising:
a staining unit comprising a plurality of staining tanks that are configured to receive glass slides smeared with samples and to accommodate a staining solution used to stain the samples smeared on the glass slides, wherein the plurality of staining tanks comprises staining tanks that accommodate a same type of staining solution;
a transfer unit that holds the glass slides and transfers the glass slides to the staining unit;
a fluid circuit that supplies the staining solution to the plurality of staining tanks in the staining unit; and
a controller that determines one or more staining tanks to be used for staining processing among the staining tanks that accommodate the same type of staining solution in response to information input by a user, and that controls the fluid circuit to supply the staining solution based on the determination.

2. The smear preparing apparatus according to claim 1, wherein the controller controls the fluid circuit:
(i) to not supply the staining solution to each of one or more staining tanks that are not determined to be used for the staining processing among the staining tanks that accommodate the same type of staining solution; or
(ii) to supply the staining solution to each of the one or more staining tanks that are not determined to be used for the staining processing among the staining tanks that accommodate the same type of staining solution in an amount smaller than an amount of the staining solution supplied to the staining tanks that are determined to be used for the staining processing among the staining tanks that accommodate the same type of staining solution.

3. The smear preparing apparatus according to claim 1, wherein the controller controls the transfer unit to transfer the glass slides to the staining unit such that the staining processing is performed in parallel in the one or more staining tanks that are determined to be used for the staining processing.

4. The smear preparing apparatus according to claim 1, wherein
the controller controls the transfer unit to transfer the glass slides, one by one, to each of the plurality of staining tanks, and
the controller controls the transfer unit to transfer, from each of the plurality of staining tanks, the glass slides for which staining time has elapsed, one by one in order.

5. The smear preparing apparatus according to claim 4, wherein the controller receives the information input by the user comprising setting of the staining time and determines the one or more staining tanks to be used for the staining processing among the staining tanks that accommodate the same type of staining solution in response to a duration of the set staining time.

6. The smear preparing apparatus according to claim 5, wherein the controller sets the number of the one or more staining tanks to be used for the staining processing among the staining tanks that accommodate the same type of staining solution such that the shorter the staining time is, the smaller the number of the one or more staining tanks to be used for the staining processing among the staining tanks that accommodate the same type of staining solution is.

7. The smear preparing apparatus according to claim 5, wherein
the plurality of staining tanks comprise a staining tank that accommodates a first staining solution and the staining tanks that accommodate the same type of staining solution comprising a second staining solution different from the first staining solution,
the staining unit performs first staining processing by using the first staining solution and then performs second staining processing by using the second staining solution,
the staining time in the second staining processing is capable of being set longer than the staining time in the first staining processing, and
the controller determines the number of the one or more staining tanks to be used for the second staining processing among the staining tanks that accommodate the same type of staining solution comprising the second staining solution in response to a duration of the set staining time in the second staining processing.

8. The smear preparing apparatus according to claim 1, wherein the controller receives the information input by the user comprising setting of a staining concentration for the samples and determines the one or more staining tanks to be used for the staining processing among the staining tanks that accommodate the same type of staining solution in response to the set staining concentration.

9. The smear preparing apparatus according to claim 8, wherein the controller sets the number of the one or more staining tanks to be used for the staining processing among the staining tanks that accommodate the same type of staining solution such that the lower the staining concentration is, the smaller the number of the one or more staining tanks to be used for the staining processing among the staining tanks that accommodate the same type of staining solution is.

10. The smear preparing apparatus according to claim 1, wherein
the plurality of staining tanks are arranged to be aligned in an order of the staining processing in the staining unit, and
the controller controls the transfer unit to not transfer the glass slides to the one or more staining tanks that are not determined to be used for the staining processing among the staining tanks that accommodate the same type of staining solution and to transfer the glass slides to the one or more staining tanks that are determined to be used for the staining processing among the staining tanks that accommodate the same type of staining solution.

11. The smear preparing apparatus according to claim 1, wherein
the fluid circuit is configured to supply a cleaning liquid to the plurality of staining tanks of the staining unit, and
the controller controls the fluid circuit such that an amount of the cleaning liquid supplied to the one or more staining tanks that are not determined to be used for the staining processing among the staining tanks that accommodate the same type of staining solution is smaller than an amount of the cleaning liquid supplied to the one or more staining tanks that are determined to be used for the staining processing among the staining tanks that accommodate the same type of staining solution.

12. The smear preparing apparatus according to claim 1, further comprising a display unit, wherein
the controller controls, when there is the one or more staining tanks that are not determined to be used for the staining processing, the display unit such that presence of the one or more staining tanks that are determined to be used for the staining processing and the one or more staining tanks that are not determined to be used for the staining processing are identifiable.

13. The smear preparing apparatus according to claim 1, wherein the information input by the user comprises a staining condition for staining processing.

14. The smear preparing apparatus according to claim 1, wherein the information input by the user comprises a staining condition for staining processing including at least one of a staining time for the samples, a staining concentration for the samples, and a number of the one or more staining tanks to be used for staining processing.

15. The smear preparing apparatus according to claim 1, wherein the controller controls a display device to display a setting screen that prompts a user to set a staining condition for staining processing and determines the one or more staining tanks to be used for the staining processing among the staining tanks that accommodate the same type of staining solution in response to the staining condition set by the user as the information input by the user.

16. A smear preparing method in which staining processing is performed by immersing samples smeared on glass slides in a staining solution accommodated in a staining unit, the staining unit including a plurality of staining tanks configured to receive the glass slides smeared with the samples and to accommodate the staining solution, wherein the plurality of staining tanks includes staining tanks that accommodate a same type of staining solution, comprising:
determining one or more staining tanks to be used for the staining processing among the staining tanks that accommodate the same type of staining solution in response to information input by a user and controlling a fluid circuit to supply the staining solution based on the determination; and performing the staining processing by transferring the glass slides to the one or more staining tanks that are determined to be used for the staining processing among the staining tanks that accommodate the same type of staining solution.

17. The smear preparing method according to claim 16, further comprising:

supplying a predetermined amount of the staining solution to the each of the one or more staining tanks that is determined to be used for the staining processing among the staining tanks that accommodate the same type of staining solution; and not supplying the staining solution to a staining tank that is not determined to be used for the staining processing among the staining tanks that accommodate the same type of staining solution, or supplying the staining solution to the staining tank that is not determined to be used for the staining processing among the staining tanks that accommodate the same type of staining solution in an amount smaller than an amount of the staining solution supplied to the staining tank that is determined to be used for the staining processing among the staining tanks that accommodate the same type of staining solution.

18. The smear preparing method according to claim 16, wherein the staining processing is performed in parallel in the one or more staining tanks that are determined to be used for the staining processing.

19. The smear preparing method according to claim 16, further comprising:

holding and transferring the glass slides, one by one, to the staining tank that is determined to be used for the staining processing;

arranging the held glass slides, one by one, in the staining tank that is determined to be used for the staining processing; and taking out the glass slides for which staining time has elapsed from the staining tank that is determined to be used for the staining processing, one by one in order.

20. The smear preparing method according to claim 19, further comprising:

receiving the information input by the user comprising setting of the staining time, wherein the determining the one or more staining tanks to be used for the staining processing comprises determining the one or more staining tanks to be used for the staining processing in response to a duration of the set staining time.

21. The smear preparing method according to claim 20, wherein the shorter the set staining time is, the smaller the number of the one or more staining tanks that are determined to be used for the staining processing is set.

* * * * *